US012784497B2

(12) United States Patent
Shamshad et al.

(10) Patent No.: US 12,784,497 B2
(45) **Date of Patent: *Nov. 3, 2026**

(54) SYSTEM AND METHOD OF PROTECTING FACIAL PRIVACY USING TEXT-GUIDED MAKEUP VIA ADVERSARIAL LATENT SEARCH

(71) Applicant: Mohamed bin Zayed University of Artificial Intelligence, Abu Dhabi (AE)

(72) Inventors: Fahad Shamshad, Abu Dhabi (AE); Muzammal Naseer, Abu Dhabi (AE); Karthik Nandakumar, Abu Dhabi (AE)

(73) Assignee: Mohamed bin Zayed University of Artificial Intelligence, Abu Dhabi (AE)

( * ) Notice: Subject to any disclaimer, the term of this patent is extended or adjusted under 35 U.S.C. 154(b) by 0 days.

This patent is subject to a terminal disclaimer.

(21) Appl. No.: 19/234,049

(22) Filed: Jun. 10, 2025

(65) Prior Publication Data

US 2025/0378198 A1 Dec. 11, 2025

Related U.S. Application Data

(60) Provisional application No. 63/658,142, filed on Jun. 10, 2024.

(51) Int. Cl.

*G06V 40/16* (2022.01)
*G06F 21/62* (2013.01)
*G06T 11/60* (2006.01)

(52) U.S. Cl.

CPC ........ *G06V 40/168* (2022.01); *G06F 21/6254* (2013.01); *G06T 11/60* (2013.01)

(58) Field of Classification Search

CPC .... G06F 21/6254; G06V 40/168; G06T 11/60
See application file for complete search history.

(56) References Cited

U.S. PATENT DOCUMENTS

2024/0143835 A1* 5/2024 Khodadadeh .......... G06N 3/088

FOREIGN PATENT DOCUMENTS

CN 117912082 A 4/2024

OTHER PUBLICATIONS

Minh-Ha Le, et al., "StyleAdv: A Usable Privacy Framework Against Facial Recognition with Adversarial Image Editing", Proceedings on Privacy Enhancing Technologies , vol. 2024, Issue 2, pp. 106-123.

(Continued)

*Primary Examiner* — Ayoub Alata
(74) *Attorney, Agent, or Firm* — Oblon, McClelland, Maier & Neustadt, L.L.P.

(57) ABSTRACT

Disclosed are a method and system to protect user facial privacy against unknown face recognition levels without compromising on a user's online experience. An input source to input an original face image. A training circuit configured to train a generator model to output an image that resembles the original face image. An optimizer configured to generate a protected face image based on the trained model that fools a black-box face recognition model, while imitating a makeup style. A display device to display the protected face image online.

18 Claims, 18 Drawing Sheets

(56) References Cited

OTHER PUBLICATIONS

Decheng Liu, et al., "Adv-Diffusion: Imperceptible Adversarial Face Identity Attack via Latent Diffusion Model", Proceedings of the AAAI Conference on Artificial Intelligence, vol. 38, No. 4, 2024, pp. 3585-3593.

Jiaming Zhang, et al., "Adversarial Prompt Tuning for Vision-Language Models" Computer Vision—ECCV 2024, 18$^{th}$ European Conference, Milan, Italy, Sep. 29-Oct. 4, 2024, pp. 56-72.

* cited by examiner

Original

Encoder Inversion

Generator Finetuning

FIG. 11
Original
TIP-IM
AMT-GAN
DFPP (Ours)

Source w/o $L_{hist}$ w/o $L_{ViT}$ Ours

Source Reference w/o RCM Ours

Original Reference BeautyGAN AMT-GAN Ours

SYSTEM AND METHOD OF PROTECTING FACIAL PRIVACY USING TEXT-GUIDED MAKEUP VIA ADVERSARIAL LATENT SEARCH

CROSS-REFERENCE TO RELATED APPLICATIONS

This application claims the benefit of priority to provisional application No. 63/658,142 filed Jun. 10, 2024, the entire contents of which are incorporated herein by reference.

STATEMENT REGARDING PRIOR DISCLOSURE BY THE INVENTORS

Aspects of this technology are described in "CLIP2Protect: Protecting Facial Privacy using Text-Guided Makeup via Adversarial Latent Search," Proceedings of the IEEE/CVF Conference on Computer Vision and Pattern Recognition (CVPR), 2023, pp. 20595-20605, and is herein incorporated by reference in its entirety.

Aspects of this technology are described in "Makeup-Guided Facial Privacy Protection via Untrained Neural Network Priors," Proceedings of ECCV Workshop on Explainable AI for Biometrics, 2024, and is herein incorporated by reference in its entirety.

BACKGROUND

Technical Field

The present disclosure is directed to a method and system to protect user facial privacy against unknown face recognition levels without compromising on a user's online experience. The method and system avoids artifacts in a protected image by restricting a search for adversarial faces close to a clean image manifold learned by a generative model. The method and system employ natural makeup-like perturbations via guidance from a text prompt. The systems and methods further employ an encoder-decoder-based approach that solely optimizes the weights of a randomly initialized neural network at test-time for natural-looking adversarial makeup transfer.

Description of Related Art

Deep learning based face recognition (FR) systems have found widespread usage in multiple applications, including security, biometrics, and criminal investigation, outperforming humans in many scenarios. Despite positive aspects of this technology, FR systems seriously threaten personal security and privacy in the digital world because of their potential to enable mass surveillance capabilities. For example, government and private entities can use FR systems to track user relationships and activities by scraping face images from social media profiles such as Twitter, Linkedin, and Facebook. These entities generally use proprietary FR systems, whose specifications are unknown to the public (referred to as a black box model). Therefore, there is a need for an effective approach that protects facial privacy against such unknown (black box) FR systems.

An ideal facial privacy protection algorithm must strike the right balance between naturalness and privacy protection of facial images. In this context, "naturalness" is defined as the absence of any noise artifacts that can be easily perceived by human observers and the preservation of human-perceived identity. "Privacy protection" refers to the fact that the protected image must be capable of deceiving a malicious black-box FR system. In other words, the protected image must closely resemble the given face image and be artifact-free for a human observer, while at the same time fool an unknown automated FR system such that the FR system is not able to recognize the identity of the person in the given face image. Since failure to generate naturalistic faces can significantly affect user experience on social media platforms, the user experience is a necessary precondition for adoption of a privacy-enhancement algorithm.

Conventional works exploit adversarial attacks to conceal user identity by overlaying noise-constrained (bounded) adversarial perturbations on the original face image. Since the adversarial examples are generally optimized in the image space, it is often difficult to simultaneously achieve naturalness and privacy. Unlike noise-based methods, unrestricted adversarial examples are not constrained by the magnitude of perturbation in the image space and have demonstrated better perceptual realism for human observers while being adversarially effective.

Several efforts have been made to generate unrestricted adversarial examples that mislead FR systems (see Table 1). Among these, adversarial makeup based methods are gaining increasing attention as they can embed adversarial modifications in a more natural way. These approaches use generative adversarial networks (GANs) to adversarially transfer makeup styles from a given reference image to the user's face image while impersonating a target identity. However, existing techniques based on adversarial makeup transfer have the following limitations: (i) adversarial toxicity in these methods hamper the performance of the makeup transfer module, thereby resulting in unnatural faces with makeup artifacts (see FIG. 1); (ii) the use of a reference image to define the desired makeup style affects the practicality of this approach; (iii) for every new target identity, these approaches require end-to-end retraining from scratch using large datasets of makeup-related images; and (iv) most of these methods primarily aim at impersonation of the target identity, whereas the desired privacy objective is dodging or failing in automatic recognition, i.e., multiple images of the user's face scraped from different social media sites must not match with each other.

For purposes of this disclosure, dodging, or dodging attacks, are intended to fool a face recognition system into not recognizing a person. In contrast, impersonation, or impersonation attacks, intend to make the face recognition system incorrectly identify the attacker as a specific person.

TABLE 1

Comparison among different facial privacy protection methods with respect to the natural outputs, black box setting, experiments under face verification and identification tasks, unrestricted (semantically meaningful), and more flexible text guided adversaries.

| | Adv-Makeup | TIP-IM | AMT-GAN | Ours |
|---|---|---|---|---|
| Natural outputs | Yes | Partially | Partially | Yes |
| Black box | Yes | Yes | Yes | Yes |
| Verification | Yes | No | Yes | Yes |
| Identification | No | Yes | No | Yes |
| Unrestricted | Yes | No | Yes | Yes |
| Text guided | No | No | No | Yes |

See Bangjie Yin, Wenxuan Wang, Taiping Yao, Junfeng Guo, Zelun Kong, Shouhong Ding, Jilin Li, and Cong Liu. Adv-makeup: A new imperceptible and transferable attack on face recognition. In *Proceedings of the* 30*th International*

*Joint Conference on Artificial Intelligence* (*IJCAI*'21), pages 1252-1258, 2021; Xiao Yang, Yinpeng Dong, Tianyu Pang, Hang Su, Jun Zhu, Yuefeng Chen, and Hui Xue. Towards face encryption by generating adversarial identity masks. In Proceedings of the 2021 IEEE/CVF International Conference on Computer Vision (ICCV'21), pages 3897-3907, 2021; and Shengshan Hu, Xiaogeng Liu, Yechao Zhang, Minghui Li, Leo Yu Zhang, Hai Jin, and LibingWu. Protecting facial privacy: Generating adversarial identity masks via style-robust makeup transfer. In Proceedings of the IEEE/CVF Conference on Computer Vision and Pattern Recognition, pages 15014-15023, 2022.

Obfuscation is a widely used technique to protect user's facial privacy. See Blaž Meden, Peter Rot, Philipp Terhörst, Naser Damer, Arjan Kuijper, Walter J Scheirer, Arun Ross, Peter Peer, and Vitomir Štruc. Privacy-enhancing face biometrics: A comprehensive survey. IEEE Transactions on Information Forensics and Security, 2021. Earlier obfuscation approaches typically degrade the quality of the original face image by applying simple operations such as masking, filtering, and image transformations. See Sachith Seneviratne, Nuran Kasthuriarachchi, Sanka Rasnayaka, Danula Hettiachchi, and Ridwan Shariffdeen. Does a face mask protect my privacy?: Deep learning to predict protected attributes from masked face images. In *Australasian Joint Conference on Artificial Intelligence*, pages 91-102. Springer, 2022; Yinggui Wang, Jian Liu, Man Luo, Le Yang, and Li Wang. Privacy-preserving face recognition in the frequency domain. 2022; Tao Li and Min Soo Choi. Deepblur: A simple and effective method for natural image obfuscation. *arXiv preprint arXiv:* 2104.02655, 1, 2021; Jizhe Zhou and Chi-Man Pun. Personal privacy protection via irrelevant faces tracking and pixelation in video live streaming. *IEEE Transactions on Information Forensics and Security,* 16:1088-1103, 2020; Ali Dabouei, Sobhan Soleymani, Jeremy Dawson, and Nasser Nasrabadi. Fast geometrically-perturbed adversarial faces. In 2019 *IEEE Winter Conference on Applications of Computer Vision* (*WACV*), pages 1979-1988. IEEE, 2019; Suolan Liu, Lizhi Kong, and Hongyuan Wang. Face detection and encryption for privacy preserving in surveillance video. In *Chinese Conference on Pattern Recognition and Computer Vision* (*PRCV*), pages 162-172. Springer, 2018; and Shunxin Wang, Una M Kelly, and Raymond N J Veldhuis. Gender obfuscation through face morphing. In 2021 *IEEE International Workshop on Biometrics and Forensics* (*IWBF*), pages 1-6. IEEE, 2021. While these relatively simple obfuscation techniques are reasonable for surveillance applications, they are ill-suited for online/social media platforms where user experience is critical. See Seong Joon Oh, Rodrigo Benenson, Mario Fritz, and Bernt Schiele. Faceless person recognition: Privacy implications in social media. In *European Conference on Computer Vision*, pages 19-35. Springer, 2016. Though deep learning based obfuscation approaches generate more realistic images, they often result in a change of identity compared to the original image and occasionally produce undesirable artifacts. See Jia-Wei Chen, Li-Ju Chen, Chia-Mu Yu, and Chun-Shien Lu. Perceptual indistinguishability-net (pi-net): Facial image obfuscation with manipulable semantics. In *Proceedings of the IEEE/CVF Conference on Computer Vision and Pattern Recognition*, pages 6478-6487, 2021; William L Croft, Jörg-Rüdiger Sack, and Wei Shi. Differentially private facial obfuscation via generative adversarial networks. *Future Generation Computer Systems,* 129:358-379, 2022; Qianru Sun, Liqian Ma, Seong Joon Oh, Luc Van Gool, Bernt Schiele, and Mario Fritz. Natural and effective obfuscation by head inpainting. In *Proceedings of the IEEE Conference on Computer Vision and Pattern Recognition*, pages 5050-5059, 2018; Huan Tian, Tianqing Zhu, and Wanlei Zhou. Fairness and privacy preservation for facial images: Gan-based methods. *Computers & Security,* 122:102902, 2022; Zhenzhong Kuang, Zhiqiang Guo, Jinglong Fang, Jun Yu, Noboru Babaguchi, and Jianping Fan. Unnoticeable synthetic face replacement for image privacy protection. *Neurocomputing,* 457:322-333, 2021; Zhenzhong Kuang, Huigui Liu, Jun Yu, Aikui Tian, Lei Wang, Jianping Fan, and Noboru Babaguchi. Effective de-identification generative adversarial network for face anonymization. In *Proceedings of the 29th ACM International Conference on Multimedia*, pages 3182-3191, 2021; and Tao Li and Lei Lin. Anonymousnet: Natural face de-identification with measurable privacy. In *Proceedings of the IEEE/CVF conference on computer vision and pattern recognition workshops*, pages 0-0, 2019.

Adversarial attack tactics have been used to protect users from unauthorized FR models. Some methods rely on data poisoning to deceive targeted FR models, but are less practical because access to the training data or the gallery set of the unknown FR system is often not available. See Valeriia Cherepanova, Micah Goldblum, Harrison Foley, Shiyuan Duan, John P Dickerson, Gavin Taylor, and Tom Goldstein. Lowkey: Leveraging adversarial attacks to protect social media users from facial recognition. In International Conference on Learning Representations, 2020; and Shawn Shan, Emily Wenger, Jiayun Zhang, Huiying Li, Haitao Zheng, and Ben Y Zhao. Fawkes: Protecting privacy against unauthorized deep learning models. In $29^{th}$ USENIX security symposium (USENIX Security 20), pages 1589-1604, 2020. Other approaches have used game-theory perspective in white-box settings or person-specific privacy masks (one mask per person) to generate protected images at the cost of acquiring multiple images of the same user. See Seong Joon Oh, Mario Fritz, and Bernt Schiele. Adversarial image perturbation for privacy protection a game theory perspective. In 2017 IEEE International Conference on Computer Vision (*ICCV*), pages 1491-1500. IEEE, 2017; and Yaoyao Zhong and Weihong Deng. Opom: Customized invisible cloak towards face privacy protection. IEEE Transactions on Pattern Analysis and Machine Intelligence, 2022. In TIPIM, targeted optimization was used to generate privacy masks against unknown FR models by introducing a naturalness constraint. While this approach provides effective privacy, it generates output images with perceptible noises that can affect the user experience.

Unrestricted adversarial attacks (UAAs) are not constrained by the perturbation norm and can induce large but semantically meaningful perturbations. These attacks have been extensively studied in image classification literature and it has been shown that outputs generated via UAAs are less perceptible to human observers as compared to noise-based adversarial attacks. See Anand Bhattad, Min Jin Chong, Kaizhao Liang, Bo Li, and David A Forsyth. Unrestricted adversarial examples via semantic manipulation. arXiv preprint arXiv: 1904.06347, 2019; Fangcheng Liu, Chao Zhang, and Hongyang Zhang. Towards transferable unrestricted adversarial examples with minimum changes. *arXiv preprint arXiv:* 2201.01102, 2022; Yang Song, Rui Shu, Nate Kushman, and Stefano Ermon. Constructing unrestricted adversarial examples with generative models. Advances in Neural Information Processing Systems, 31, 2018; Chaowei Xiao, Jun-Yan Zhu, Bo Li, Warren He, Mingyan Liu, and Dawn Song. Spatially transformed adversarial examples. arXiv preprint arXiv: 1801.02612, 2018; Shengming Yuan, Qilong Zhang, Lianli Gao, Yaya Cheng, and Jingkuan Song. Natural color fool: Towards boosting black-box unrestricted attacks. *arXiv preprint arXiv:* 2210.02041, 2022; and Zhengyu Zhao, Zhuoran Liu, and Martha Larson. Towards large yet imperceptible adversarial image perturbations with perceptual color distance. In Proceedings of the IEEE/CVF Conference on Computer Vision and Pattern Recognition, pages 1039-1048, 2020. Motivated by this observation, patch-based unrestricted attacks have been proposed to generate wearable adversarial accessories like colorful glasses, hat or random patch to fool the FR model, but such synthesized patches generally have weak transferability due to the limited editing region and the large visible pattern compromises naturalness and affects user experience. See Mahmood Sharif, Sruti Bhagavatula, Lujo Bauer, and Michael K Reiter. A general framework for adversarial examples with objectives. *ACM Transactions on Privacy and Security* (*TOPS*), 22 (3): 1-30, 2019; Stepan Komkov and Aleksandr Petiushko. Advhat: Real-world adversarial attack on arcface face id system. In 2020 25*th International Conference on Pattern Recognition* (*ICPR*), pages 819-826. IEEE, 2021; and Zihao Xiao, Xianfeng Gao, Chilin Fu, Yinpeng Dong, Wei Gao, Xiaolu Zhang, Jun Zhou, and Jun Zhu. Improving transferability of adversarial patches on face recognition with generative models. In *Proceedings of the IEEE/CVF Conference on Computer Vision and Pattern Recognition*, pages 11845-11854, 2021. Recently, generative models have been leveraged to craft UAAs against FR models. See Phillip Isola, Jun-Yan Zhu, Tinghui Zhou, and Alexei A Efros. Image-to-image translation with conditional adversarial networks. In *Proceedings of the IEEE conference on computer vision and pattern recognition*, pages 1125-1134, 2017; and Tim Salimans, Ian Goodfellow, Wojciech Zaremba, Vicki Cheung, Alec Radford, and Xi Chen. Improved techniques for training gans. *Advances in neural information processing systems,* 29, 2016. However, these generative approaches are either designed for white-box settings or show limited performance in query-free black-box settings. See Omid Poursaeed, Tianxing Jiang, Harry Yang, Serge Belongie, and Ser-Nam Lim. Robustness and generalization via generative adversarial training. In *Proceedings of the IEEE/CVF International Conference on Computer Vision*, pages 15711-15720, 2021; Zheng-An Zhu, Yun-Zhong Lu, and Chen-Kuo Chiang. Generating adversarial examples by makeup attacks on face recognition. In 2019 *IEEE International Conference on Image Processing* (*ICIP*), pages 2516-2520. IEEE, 2019; and Kazuya Kakizaki and Kosuke Yoshida. Adversarial image translation: Unrestricted adversarial examples in face recognition systems. arXiv preprint arXiv: 1905.03421, 2019. Makeup-based UAAs have also been proposed against FR systems by embedding the perturbations into a natural makeup effect. See Nitzan Guetta, Asaf Shabtai, Inderjeet Singh, Satoru Momiyama, and Yuval Elovici. Dodging attack using carefully crafted natural makeup. *arXiv preprint arXiv:* 2109.06467, 2021; and Yin et al., *arXiv preprint arXiv:* 2105.03162. These makeup based attacks have also been exploited to protect the user privacy by applying adversarial makeup on the user face image. See Shengshan Hu et al. However, interference between adversarial perturbations and makeup transfer can produce undesirable makeup artifacts in the output images. Moreover, these attacks generally assume access to large makeup datasets for training models and require a reference makeup image.

Cross-modal vision-language modelling has attracted significant attention. See Yifan Du, Zikang Liu, Junyi Li, and Wayne Xin Zhao. A survey of vision-language pre-trained models. *arXiv preprint arXiv:* 2202.10936, 2022. OpenAI introduced CLIP that is trained on 400 million image-text pairs using contrastive objective and maps both image and text in a joint multimodal embedding space. See Alec Radford, Jong Wook Kim, Chris Hallacy, Aditya Ramesh, Gabriel Goh, Sandhini Agarwal, Girish Sastry, Amanda Askell, Pamela Mishkin, Jack Clark, et al. Learning transferable visual models from natural language supervision. In *International Conference on Machine Learning*, pages 8748-8763. PMLR, 2021. With powerful representation embedding of CLIP, several methods have been proposed to manipulate images with text-guidance. StyleCLIP and DiffusionCLIP leverage the powerful generative capabilities of StyleGAN and diffusion models to manipulate images with text prompts. See Or Patashnik, Zongze Wu, Eli Shechtman, Daniel Cohen-Or, and Dani Lischinski. Styleclip: Text-driven manipulation of stylegan imagery. In *Proceedings of the IEEE/CVF International Conference on Computer Vision*, pages 2085-2094, 2021; Gwanghyun Kim, Taesung Kwon, and Jong Chul Ye. Diffusionclip: Text-guided diffusion models for robust image manipulation. In *Proceedings of the IEEE/CVF Conference on Computer Vision and Pattern Recognition*, pages 2426-2435, 2022; and Alex Nichol, Prafulla Dhariwal, Aditya Ramesh, Pranav Shyam, Pamela Mishkin, Bob McGrew, Ilya Sutskever, and Mark Chen. Glide: Towards photorealistic image generation and editing with text-guided diffusion models. *arXiv preprint arXiv:* 2112.10741, 2021. Other similar works include HairCLIP, CLIP-NeRF, CLIPstyler, and CLIPDraw. See Tianyi Wei, Dongdong Chen, Wenbo Zhou, Jing Liao, Zhentao Tan, Lu Yuan, Weiming Zhang, and Nenghai Yu. Hairclip: Design your hair by text and reference image. In *Proceedings of the IEEE/CVF Conference on Computer Vision and Pattern Recognition*, pages 18072-18081, 2022; Can Wang, Menglei Chai, Mingming He, Dongdong Chen, and Jing Liao. Clipnerf: Text-and-image driven manipulation of neural radiance fields. In *Proceedings of the IEEE/CVF Conference on Computer Vision and Pattern Recognition*, pages 3835-3844, 2022; Gihyun Kwon and Jong Chul Ye. Clipstyler: Image style transfer with a single text condition. In *Proceedings of the IEEE/CVF Conference on Computer Vision and Pattern Recognition*, pages 18062-18071, 2022; and Kevin Frans, Lisa B Soros, and Olaf Witkowski. Clipdraw: Exploring text-to-drawing synthesis through language-image encoders. *arXiv preprint arXiv:* 2106.14843, 2021. While these methods focus on the text-guidance ability of CLIP, they are still insufficient for privacy protection against black-box FR models.

As mentioned above, adversarial attacks have been widely used to protect users from unauthorized FR models. These approaches can be broadly categorized into noise-based and unrestricted adversarial examples. Noise-based methods include data poisoning, game theory, and privacy masks, but often require multiple user images, access to training data, or are limited to white-box settings. See Cherepanova, V., Goldblum, M., Foley, H., Duan, S., Dickerson, J. P., Taylor, G., Goldstein, T.: Lowkey: Leveraging adversarial attacks to protect social media users from facial recognition. In: *International Conference on Learning Representations* (2020); Shan, S., Wenger, E., Zhang, J., Li, H., Zheng, H., Zhao, B. Y.: Fawkes: Protecting privacy against unauthorized deep learning models. In: *Proceedings of the 29th USENIX Security Symposium* (*USENIX Security*'20). pp. 1589-1604 (2020); Oh, S. J., Fritz, M., Schiele, B.: Adversarial image perturbation for privacy protection a game theory perspective. In: 2017 *IEEE International Conference on Computer Vision* (*ICCV*). pp. 1491-1500. IEEE (2017); and Zhong, Y., Deng, W.: Opom: Customized invisible cloak towards face privacy protection. *IEEE Transactions on Pattern Analysis and Machine Intelligence* (2022). Conventional work like TIP-IM targets black-box models but produces perceptible noise. See Yang, X., Dong, Y., Pang, T., Su, H., Zhu, J., Chen, Y., Xue, H.: Towards face encryption by generating adversarial identity masks. In: Proceedings of the 2021 IEEE/CVF International Conference on Computer Vision (ICCV'21). pp. 3897-3907 (2021). Unrestricted Adversarial Examples (UAEs) aim to create less noticeable perturbations. See Bhattad, A., Chong, M. J., Liang, K., Li, B., Forsyth, D. A.: Unrestricted adversarial examples via semantic manipulation. arXiv preprint arXiv: 1904.06347 (2019); Liu, F., Zhang, C., Zhang, H.: Towards transferable unrestricted adversarial examples with minimum changes. arXiv preprint arXiv: 2201.01102 (2022); Song, Y., Shu, R., Kushman, N., Ermon, S.: Constructing unrestricted adversarial examples with generative models. Advances in Neural Information Processing Systems 31 (2018); Yuan, S., Zhang, Q., Gao, L., Cheng, Y., Song, J.: Natural color fool: Towards boosting black-box unrestricted attacks. arXiv preprint arXiv: 2210.02041 (2022); and Zhao, Z., Liu, Z., Larson, M.: Towards large yet imperceptible adversarial image perturbations with perceptual color distance. In: Proceedings of the IEEE/CVF Conference on Computer Vision and Pattern Recognition. pp. 1039-1048 (2020). These include patch-based attacks creating wearable items including hats or colorful glasses, but they often suffer from poor transferability and unnatural appearance. See Komkov, S., Petiushko, A.: Advhat: Real-world adversarial attack on arcface face id system. In: 2020 25*th International Conference on Pattern Recognition* (*ICPR*). pp. 819-826. IEEE (2021); Sharif, M., Bhagavatula, S., Bauer, L., Reiter, M. K.: A general framework for adversarial examples with objectives. *ACM Transactions on Privacy and Security* (*TOPS*) 22 (3), 1-30 (2019); and Xiao et al. Generative model-based UAEs show promise but have limited performance in black-box settings. See Kakizaki, K., Yoshida, K.: Adversarial image translation: Unrestricted adversarial examples in face recognition systems. *arXiv preprint arXiv:* 1905.03421 (2019); Poursaeed, O., Jiang, T., Yang, H., Belongie, S., Lim, S. N.: Robustness and generalization via generative adversarial training. In: *Proceedings of the IEEE/CVF International Conference on Computer Vision*. pp. 15711-15720 (2021); and Zhu, Z. A., Lu, Y. Z., Chiang, C. K.: Generating adversarial examples by makeup attacks on face recognition. In: 2019 *IEEE International Conference on Image Processing* (*ICIP*). pp. 2516-2520. IEEE (2019).

Some approaches have leveraged makeup-based unrestricted attacks to deceive FR systems by embedding adversarial perturbations into natural makeup effects. See Guetta, N., Shabtai, A., Singh, I., Momiyama, S., Elovici, Y.: Dodging attack using carefully crafted natural makeup. *arXiv preprint arXiv:* 2109.06467 (2021); Shengshan Hu et al. (2022); Pi, J., Zeng, J., Lu, Q., Jiang, N., Wu, H., Zeng, L., Wu, Z.: Adv-eye: A transfer-based natural eye shadow attack on face recognition. *IEEE Access* (2023); Yin, B., Wang, W., Yao, T., Guo, J., Kong, Z., Ding, S., Li, J., Liu, C.: Adv-makeup: A new imperceptible and transferable attack on face recognition. *arXiv preprint arXiv:* 2105.03162 (2021); and Zhu et al. However, these methods often require training on large makeup datasets, potentially introducing gender bias, and can produce undesirable artifacts when source and reference styles differ significantly. See Karakas, C. E., Dirik, A., Yalçnkaya, E., Yanardag, P.: Fairstyle: Debiasing stylegan2 with style channel manipulations. In: *European Conference on Computer Vision*. pp. 570-586. Springer (2022); and Muñoz, C., Zannone, S., Mohammed, U., Koshiyama, A.: Uncovering bias in face generation models. *arXiv preprint arXiv:* 2302.11562 (2023). Additionally, text-based prompts may not capture complex makeup styles as effectively as reference images. For example, DiffAM utilized pre-trained diffusion models for facial privacy protection in face verification scenarios, but still relied on a pre-trained generator. See Sun, Y., Yu, L., Xie, H., Li, J., Zhang, Y.: Diffam: Diffusion-based adversarial makeup transfer for facial privacy protection. In: *Proceedings of the IEEE/CVF Conference on Computer Vision and Pattern Recognition*. pp. 24584-24594 (2024).

While pre-trained generative models have effectively solved a myriad of applications, untrained neural network priors have also demonstrated significant potential in various vision tasks. See Asim, M., Shamshad, F., Ahmed, A.: Blind image deconvolution using pretrained generative priors. *arXiv preprint arXiv:* 1908.07404 (2019); Asim, M., Shamshad, F., Ahmed, A.: Blind image deconvolution using deep generative priors. *IEEE Transactions on Computational Imaging* 6, 1493-1506 (2020); Shamshad, F., Abbas, F., Ahmed, A.: Deep ptych: Subsampled fourier ptychography using generative priors. In: *ICASSP* 2019-2019 *IEEE International Conference on Acoustics*, Speech and Signal Processing (ICASSP). pp. 7720-7724. IEEE (2019); Shamshad, F., Ahmed, A.: Robust compressive phase retrieval via deep generative priors. *arXiv preprint arXiv:* 1808.05854 (2018); Shamshad, F., Ahmed, A.: Class-specific blind deconvolutional phase retrieval under a generative prior. *arXiv preprint arXiv:* 2002.12578 (2020); Shamshad, F., Ahmed, A.: Compressed sensing-based robust phase retrieval via deep generative priors. *IEEE Sensors Journal* 21 (2), 2286-2298 (2020); Shamshad, F., Hanif, A., Abbas, F., Awais, M., Ahmed, A.: Adaptive ptych: Leveraging image adaptive generative priors for subsampled fourier ptychography. In: *Proceedings of the IEEE/CVF International Conference on Computer Vision Workshops*. pp. 0-0 (2019); Shamshad, F., Hanif, A., Ahmed, A.: Subsampled fourier ptychography via pretrained invertible and untrained network priors. In: *NeurIPS* 2019 *Workshop on Solving Inverse Problems with Deep Networks* (2019); Shamshad, F., Srivatsan, K., Nandakumar, K.: Evading forensic classifiers with attribute-conditioned adversarial faces. In: *Proceedings of the IEEE/CVF Conference on Computer Vision and Pattern Recognition*. pp. 16469-16478 (2023); and Xia, W., Zhang, Y., Yang, Y., Xue, J. H., Zhou, B., Yang, M. H.: Gan inversion: A survey. *IEEE Transactions on Pattern Analysis and Machine Intelligence* (2022). These untrained (randomly initialized) neural networks have recently gained traction as effective image priors for a myriad of visual inverse problems, including denoising, super-resolution, inpainting, image matching, enhancement and scene flow. See Qayyum, A., Ilahi, I., Shamshad, F., Boussaid, F., Bennamoun, M., Qadir, J.: Untrained neural network priors for inverse imaging problems: A survey. *IEEE Transactions on Pattern Analysis and Machine Intelligence* (2022); Ulyanov, D., Vedaldi, A., Lempitsky, V.: Deep image prior. In: *Proceedings of the IEEE conference on computer vision and pattern recognition*. pp. 9446-9454 (2018); Mataev, G., Milanfar, P., Elad, M.: Deepred: Deep image prior powered by red. In: *Proceedings of the IEEE/CVF International Conference on Computer Vision Workshops*. pp. 0-0 (2019); Schrader, K., Alt, T., Weickert, J., Ertel, M.: Cnn-based euler's *elastica* inpainting with deep energy and deep image prior. In: 2022 10*th European Workshop on Visual Information Processing* (*EUVIP*). pp. 1-6. IEEE (2022); Hong, S., Kim, S.: Deep matching prior: Test-time optimization for dense correspondence. In: *Proceedings of the IEEE/CVF*

*International Conference on Computer Vision*. pp. 9907-9917 (2021); Asim, M., Shamshad, F., Ahmed, A.: Patchdip exploiting patch redundancy in deep image prior for denoising. In: *NeurIPS* 2019 *Workshop on Solving Inverse Problems with Deep Networks* (2019); Qayyum, A., Sultani, W., Shamshad, F., Qadir, J., Tufail, R.: Single-shot retinal image enhancement using deep image priors. In: *Medical Image Computing and Computer Assisted Intervention—MICCAI* 2020: 23*rd International Conference*, Lima, Peru, Oct. 4-8, 2020, Proceedings, Part V 23. pp. 636-646. Springer (2020); Qayyum, A., Sultani, W., Shamshad, F., Tufail, R., Qadir, J.: Single-shot retinal image enhancement using untrained and pretrained neural networks priors integrated with analytical image priors. *Computers in Biology and Medicine* 148, 105879 (2022); Shamshad et al., *NeurIPS* 2019 *Workshop on Solving Inverse Problems with Deep Networks* (2019); and Li, X., Kaesemodel Pontes, J., Lucey, S.: Neural scene flow prior. *Advances in Neural Information Processing Systems* 34, 7838-7851 (2021). The underpinning idea is that intricate image statistics can be captured by the structure of randomly initialized neural networks, such as CNNs, using the random weights as a parameterization of the resultant output image. While these untrained network priors have found success in various applications, their potential in facial privacy protection remains unexplored. See Qayyum et al. (2022).

Accordingly, it is one object of the present disclosure to provide systems and methods to protect user facial privacy on online platforms against unknown (black-box) FR models without compromising on the user's online experience. A further object is to avoid artifacts in a protected image by restricting the search for adversarial faces close to the clean image manifold learned by a generative model. A further object is to effectively preserve human-perceived identity during attack while offering high privacy against automated systems. A further object is to provide more flexibility to the user compared to reference image-based adversarial makeup transfer. A further object of the present disclosure is to provide systems and methods that avoid the need for large-scale training on makeup datasets, effectively mitigating dataset bias.

SUMMARY

In an exemplary embodiment, a system to protect user facial privacy against unknown face recognition levels without compromising on a user's online experience, including an input source to input an original face image; a training circuit configured to train a generator model to output an image that resembles the original face image; an optimizer configured to generate a protected face image based on the trained model that fools a black-box face recognition model, while imitating a makeup style; and a display device to display the protected face image online.

In a further exemplary embodiment, a method to protect user facial privacy against unknown face recognition levels without compromising on a user's online experience, including inputting, by an input source, an original face image; training, by a training circuit, a generator model to output an image that resembles the source image; generating, by an optimizer, a protected face image based on the trained model that fools a black-box face recognition model, while imitating a makeup style; and displaying, by a display device, the protected face image online.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
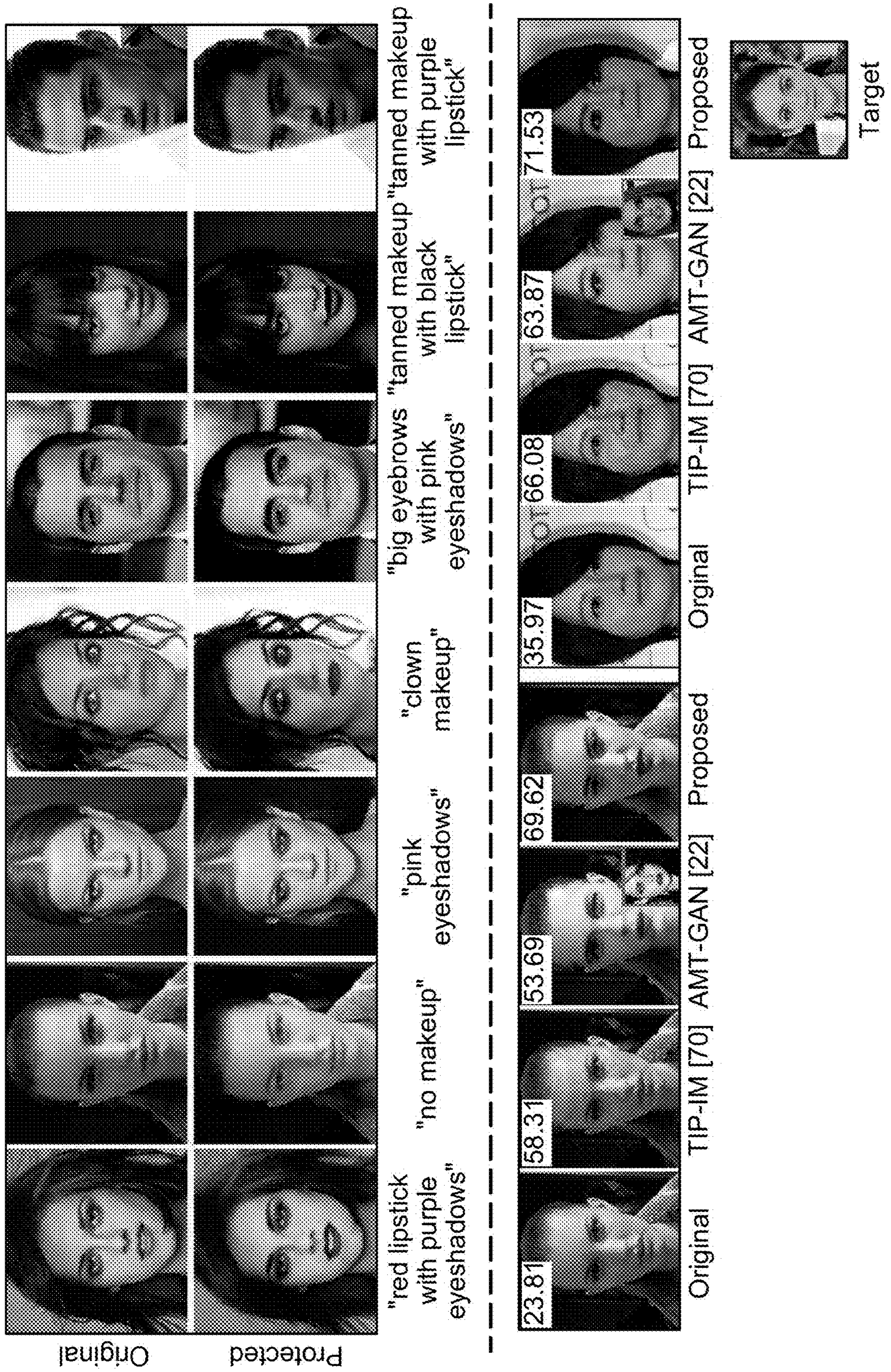
FIG. 1 are images illustrating "naturalistic" and transferable text-guided adversarial faces to deceive black-box face recognition systems in accordance with an exemplary aspect of the disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

An aspect is to protect user facial privacy on online platforms. One approach aims to search for adversarial latent codes in a low-dimensional manifold learned by a generative model trained to generate face images. The one approach is a two-step method to search for adversarial latent codes, which can be used by a generative model (e.g., StyleGAN) to produce face images with high visual quality that matches human-perceived identity, while deceiving black-box FR systems. An aspect is a technique for leveraging user-defined textual (makeup) prompts to traverse over the latent manifold of the generative model and find transferable adversarial latent codes. An aspect is a regularizer that preserves identity-related attributes within the latent space of the generative model and ensures that the protected face image visually resembles the original face.

The one approach is a two-stage, text-guided method, and addresses issues with privacy protection. However, the one approach relies on pretrained StyleGANs, making it susceptible to inherent dataset biases. A further approach eliminates dependency on pre-trained generative models, mitigating dataset bias issues. By employing reference images for makeup style transfer, the further approach offers users enhanced flexibility and granular control over desired makeup styles. The further approach can be extended to images and videos.

As such, a further aspect is an encoder-decoder-based approach, referred to as Deep Facial Privacy Prior (DFPP), that solely optimizes the weights of a randomly initialized neural network at test-time for natural-looking adversarial makeup transfer. This approach features a robust correspondence module for semantic alignment of reference and source images in the encoder's latent space, and a randomly initialized conditional decoder with Adaptive Makeup Conditioning (AMC) layers. This approach optimizes the decoder parameters at test-time to generate protected samples that retain (i) the source's human-perceived identity, (ii) adopt the reference image's makeup style, and (iii) mimic the target image identity to evade black-box FR models. To achieve these stated objectives, the approach uses a composite loss function with three key components: a Structural Consistency Loss that maintains source identity via patch-wise matching in a pre-trained ViT feature space; a Makeup Loss that facilitates effective makeup transfer by matching region-wise color distribution and global tone while preserving background regions; and an Adversarial Loss that ensures the protected sample's features match the target image in the FR model's feature space while distancing from the source image embedding.

FIG. 1 are images illustrating "naturalistic" and transferable text-guided adversarial faces to deceive black-box face recognition systems in accordance with an exemplary aspect of the disclosure. The approach of the present disclosure finds adversarial faces on the natural image manifold in a black-box setting via guidance from makeup text prompt, which makes it less susceptible to artifacts and more practical. The first row shows original images that need to be protected and the second row shows corresponding protected images along with the user-defined makeup text prompts that guide the adversarial search. A comparison against existing methods is shown in the third row. The text annotations represent the confidence score (higher is better) output by a commercial API (Face++), when matching the protected image against the target identity shown in the bottom right. The reference image for makeup transfer is shown at the bottom corner of the corresponding adversarial image.

The two-step method is initially described at a fundamental level.

Let $x \in \mathcal{X} \subset \mathbb{R}^n$ denote the given original/real face image. Let $f(x)$: $\mathcal{X} \rightarrow \mathbb{R}^d$ be a FR model that extracts a fixed-length normalized feature representation. Let $\mathcal{D}(x_1, x_2)=D(f(x_1), f(x_2))$ be a distance metric that measures the dissimilarity between two face images $x_1$ and $x_2$ based on their respective representations $f(x_1)$ and $f(x_2)$. Generally a FR system can operate in two modes: verification and identification. A face verification system predicts that two faces belong to the same identity if $\mathcal{D}(x_1, x_2) \leq \tau$, where $\tau$ is the system threshold. On the other hand, a (closed set) face identification system compares the input image (probe) against a set of face images (gallery) and outputs the identity whose representation is most similar to that of the probe. Since the attacker can employ verification or identification to determine the user identity using black-box FR models, a protection approach should conceal the user's identity in both scenarios.

User privacy can be protected by misleading the malicious FR model through impersonation or dodging attacks. In the context of verification, impersonation (false match) implies that the protected face matches with the face of a specific target identity and dodging (false non-match) means that the protected face does not match with some other image of the same person. Similarly, for face identification, impersonation ensures that the protected image gets matched to a specified target identity in the gallery set, while dodging prevents the protected face from matching with images of the same person in the gallery.

The method solves a problem in which given the original face image x, a goal is to generate a protected face image $x^p$ such that $\mathcal{D}(x^p, x)$ is large (for successful dodging attack) and $\mathcal{D}(x^p, x^t)$ is small (for successfully impersonating a target face $x^t$), where $\mathcal{O}(x) \neq \mathcal{O}(x^t)$ and $\mathcal{O}$ is the oracle that gives the true identity labels. At the same time, a goal is to minimize $\mathcal{H}(x^p, x)$, where $\mathcal{H}$ quantifies the degree of unnaturalness introduced in the protected image $x^p$ in relation to the original image x. Formally, the optimization problem that is to be solved is:

$$\min_{x^p} \mathcal{L}(x^p) = \mathcal{D}(x^p, x^t) - \mathcal{D}(x^p, x) \quad \text{s.t. } \mathcal{H}(x^p, x) \leq \epsilon \tag{1}$$

where $\epsilon$ is a bound on the adversarial perturbation. For noise-based approach, $\mathcal{H}(x^p, x)=\|x-x^p\|$, where $\|\cdot\|_p$ denotes the $L_p$ norm. However, direct enforcement of the perturbation constraint leads to visible artifacts, which affects visual quality and user experience. Constraining the solution search space to a natural image manifold using an effective image prior can produce more realistic images. Note that the distance metric $\mathcal{D}$ is unknown since a goal is to deceive a black-box FR system.

The method involves an approach to makeup text-guided adversarial faces. The method restricts the solution space of the protected face $x^p$ to lie close to the clean face manifold $\mathcal{X}$. This manifold can be learned using a generative model trained on real human faces. Specifically, let $G_\theta(w): \mathcal{W} \rightarrow \mathbb{R}^n$ denote the pretrained generative model with weights $\theta$, where $\mathcal{W}$ is the latent space. The method consists of two steps, also referred to as stages: (i) latent code initialization and (ii) text-guided adversarial optimization.

Figure 2:
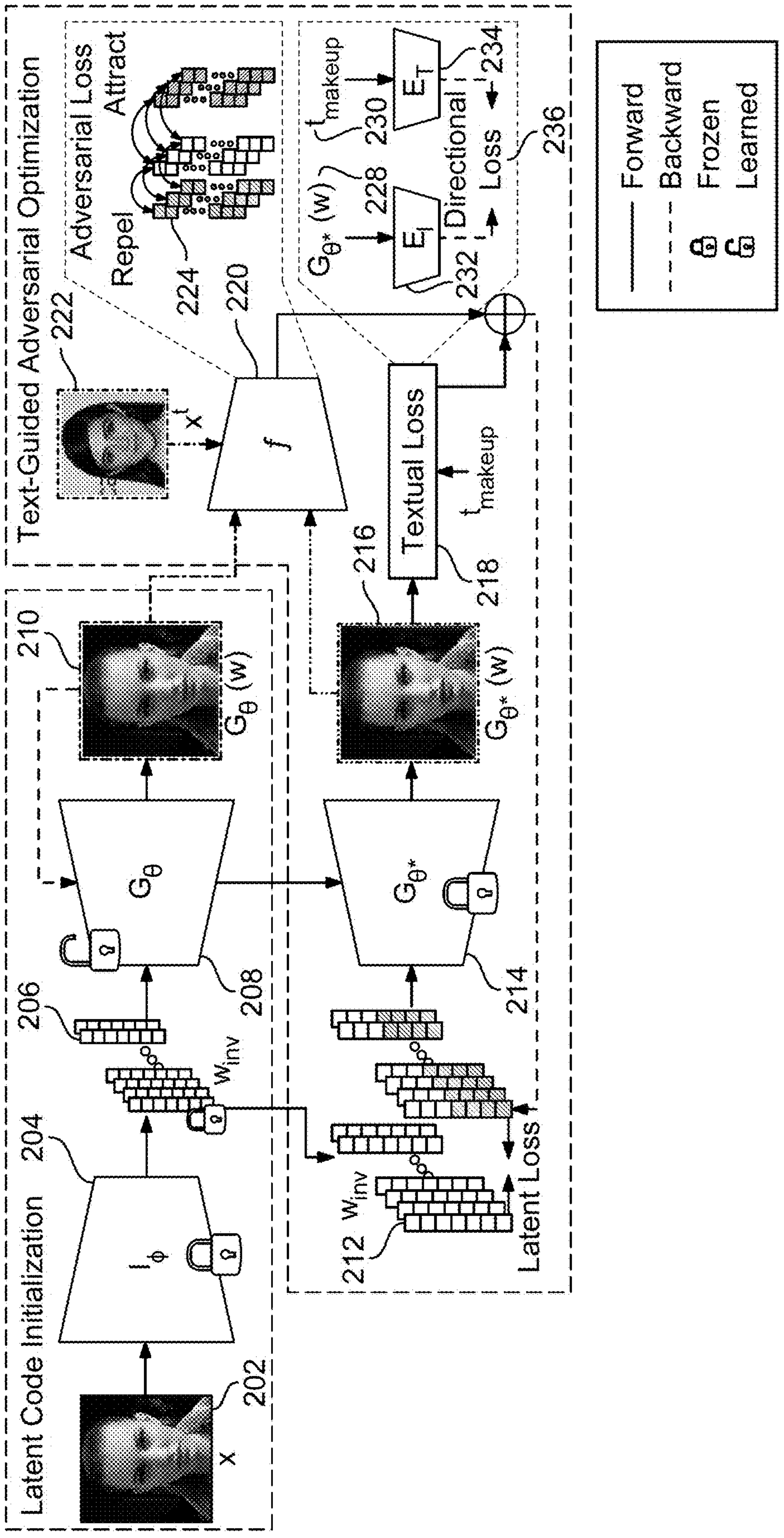
FIG. 2 is a diagram of a workflow to protect users facial privacy in accordance with an exemplary aspect of the disclosure.

FIG. 2 is a diagram of a workflow to protect users facial privacy in accordance with an exemplary aspect of the disclosure. The method, referred to as CLIP2Protect, searches for the adversarial latent codes on the generative manifold to reconstruct an adversarial face that is capable of fooling unknown FR systems for privacy protection. The method allows "makeup" editing in an adversarial manner through user defined textual prompts and thereby enhance the user's online experience. The text-guided objective searches for such latent codes while keeping the original identity preserved.

The latent code initialization stage is based on GAN inversion, which aims to invert the original image x into the latent space $\mathcal{W}$, i.e., find a latent code $w_{inv} \in \mathcal{W}$ such that $x_{inv} = G_\theta(w_{inv}) \approx x$. To achieve this, the method first uses an encoder-based inversion 204 called e4e to infer $w_{inv}$ 206 in $\mathcal{W}$ from image x 202 i.e., $w_{inv} = I_\phi(x)$, where $I_\phi: \mathcal{W} \rightarrow \mathcal{X}$ is the pretrained encoder with weights $\phi$. See Omer Tov, Yuval Alaluf, Yotam Nitzan, Or Patashnik, and Daniel Cohen-Or for a description of encoder-based inversion. Designing an encoder for StyleGAN image manipulation. *ACM Transactions on Graphics* (*TOG*), 40 (4): 1-14, 2021, incorporated herein by reference in its entirety.

Figure 3A:
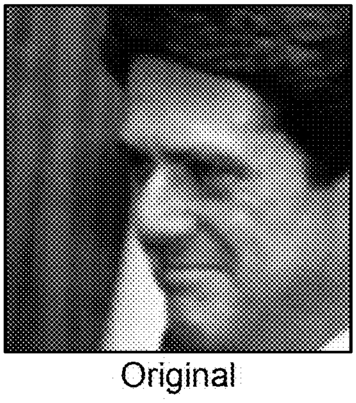
FIGS. 3A, 3B, 3C illustrate reconstructions of LFW dataset.
Figure 3B:
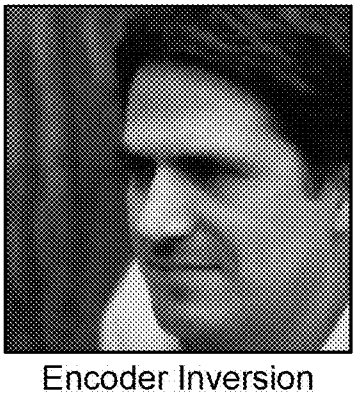
Figure 3C:
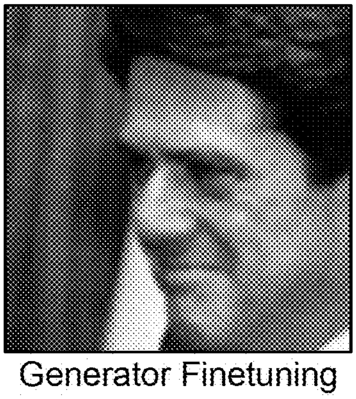

FIGS. 3A, 3B, 3C illustrate reconstructions of LFW dataset. FIG. 3A illustrates an original image. FIG. 3B illustrates encoder inversion. FIG. 3C illustrates results of generator finetuning. Generator finetuning allows near-perfect reconstructions of LFW dataset sample. This is crucial for the online experience of users. Matching scores returned by Face++ API are 62.38 and 98.96 for encoder and generator-finetuned inversions, respectively.

The method uses StyleGAN trained on a high-resolution dataset of face images as the pretrained generative model Gθ 208 due to its powerful synthesis ability and the disentangled structure of its latent space. A significant challenge during inversion is preserving the identity of the original image i.e., $\mathcal{O}(x) = \mathcal{O}(x_{inv})$. Generally, optimization and encoder-based inversion approaches struggle to preserve identity after reconstruction (see FIG. 3B), as discussed in Daniel Roich, Ron Mokady, Amit H Bermano, and Daniel Cohen-Or. Pivotal tuning for latent-based editing of real images. *ACM Transactions on Graphics* (*TOG*), 42 (1): 1-13, 2022, incorporated herein by reference in its entirety. Moreover, when using these approaches, the inversion error can be large for out-of-domain face images with extreme poses and viewpoints, which are quite common in social media applications. Therefore, these approaches cannot be applied directly to invert x. Instead, motivated by the observation that slight changes to the pretrained generator weights do not harm its editing abilities while achieving near-perfect reconstructions, the present method finetunes the pretrained generator 208 weights $\theta$ instead of the encoder 204 weights $\phi$. Effects of slight changes to pretrained generator weights on editing are provided in Daniel Roich, Ron Mokady, Amit H Bermano, and Daniel Cohen-Or. Pivotal tuning for latent-based editing of real images. ACM Transactions on Graphics (TOG), 42 (1): 1-13, 2022. Specifically, the method fixes $w_{inv} = I_\phi(x)$ and fine-tunes $G_\theta$ 208 using the following loss function:

$$\theta^* = \underset{\theta}{\operatorname{argmin}} \mathcal{L}_{LPIPS}(x, G_\theta(w_{inv})) + \lambda_2 \mathcal{L}_2(x, G_\theta(w_{inv})),$$

where $\mathcal{L}_{LPIPS}$ is the perceptual loss and $\mathcal{L}_2$ denotes the pixelwise similarity. The final inverted image $$x^*_{inv}$$

(see FIG. 3C) can be obtained by performing a forward pass of $w_{inv}$ through fine-tuned generator 208 i.e., $$x^*_{inv} = G_{\theta*}(w_{inv}).$$

The next stage is text-guided adversarial optimization.

Given the inverted latent code $w_{inv}$ 212 and fine-tuned generator $G_{\theta*}(\cdot)$ 214, a goal of the method is to adversarially perturb this latent code $w_{inv}$ in the low-dimensional generative manifold $\mathcal{W}$ to generate a protected face that fools the black-box FR model, while imitating the makeup style of the text prompt $t_{makeup}$.

To achieve these objectives, the following issues are considered: (i) how to effectively extract makeup style information from $t_{makeup}$ and apply it to the face image x in an adversarial manner?, (ii) how to regularize the optimization process so that the output face image is not qualitatively impaired?, (iii) how to craft effective adversarial perturbations that mislead black-box FR models?, and (iv) how to preserve the human-perceived identity $\mathcal{O}(x)$ of the original face image while ensuring high privacy?

The first issue can be addressed by aligning the output adversarial image 216 with the text prompt $t_{makeup}$ in the embedding space of a pretrained vision-language model. The second issue is addressed by enforcing the adversarial latent code to remain close to initialization $w_{inv}$. The third issue is solved by crafting transferable text-guided adversarial faces on a white-box surrogate model (or an ensemble of models) with the goal of boosting the fooling rate on the black-box FR model. Finally, the method leverages the disentangled nature of latent space in the generative model and incorporates an identity-preserving regularization to effectively maintain the original visual identity. Next, details are provided of the loss functions used to incorporate the above ideas.

Textual Loss 218: A preferred ingredient of the method is text-based guidance to inconspicuously hide the adversarial perturbations into the makeup effect. This can be naively achieved by aligning the representation of $t_{makeup}$ and the adversarial face $G_{\theta*}(w)$ in the common embedding space of a pre-trained vision-language model (e.g. CLIP). See Radford et al. for a description of the naïve approach. However, this naïve approach will transform the whole output image to follow the makeup style of $t_{makeup}$, which results in low diversity. Therefore, the disclosed method uses a directional CLIP loss 236 that aligns the CLIP-space direction between the text-image pairs of the original and adversarial images. Specifically, $$\mathcal{L}_{clip} = 1 - \frac{\Delta I \cdot \Delta T}{|\Delta I||\Delta T|}, \tag{2}$$

where $\Delta T = E_T(t_{makeup}) - E_T(t_{src})$ and $\Delta I = E_I(G_{\theta*}(w)) - E_I(x)$. Here, $E_T$ 234 and $E_I$ 232 are the text and image encoders of the CLIP model and $t_{src}$ is the semantic text of the input image x 202. Since the method is dealing with faces, $t_{src}$ can be simply set as "face". This loss localizes makeup transfer (e.g. red lipstick) without affecting privacy.

Adversarial Loss 220: A goal of the method is to traverse over the latent space $\mathcal{W}$ to find adversarial latent codes on the generative manifold whose face feature representation lies close to that of target image 222 and far away from the original image itself i.e., $\mathcal{D}(x^p, x) > \mathcal{D}(x^p, x^t)$. Hence, the adversarial loss 224 is:

$$\mathcal{L}_{adv} = \mathcal{D}(G_{\theta^*}(w), x^t) - \mathcal{D}(G_{\theta^*}(w), x), \tag{3}$$

where $\mathcal{D}(x_1, x_2) = 1 - \cos[f(x_1), f(x_2)]$ is the cosine distance. Since the malicious FR model is unknown in the black-box setting, Eq. 3 cannot be solved directly. Instead, following AMT-GAN, the method performs adversarial optimization on an ensemble of white-box surrogate models to imitate the decision boundary of the unknown FR model. See Shengshan Hu et al. for a description of AMT-GAN.

Identity Preservation Loss: The optimization over the generative manifold ensures that the protected image xp is natural i.e., artifact-free, however, it does not explicitly enforce the protected image to preserve the identity of the original image with respect to the human observer. To mitigate the issue, the method takes advantage of the semantic control exhibited by StyleGAN in its latent space. The latent code $w \in \mathcal{W}$ impacts image generation by controlling different level of semantics in the output image. Specifically, latent codes corresponding to the initial layers of StyleGAN control high-level aspects such as pose, general hairstyle, and face shape. A description of the initial layers of Style-GAN is provided in Tero Karras, Samuli Laine, Miika Aittala, Janne Hellsten, Jaakko Lehtinen, and Timo Aila. Analyzing and improving the image quality of stylegan. In Proceedings of the IEEE/CVF conference on computer vision and pattern recognition, pages 8110-8119, 2020. Adversarially perturbing these latent layers can change these attributes, resulting in a change of identity. Latent codes corresponding to deeper layers of StyleGAN are associated with fine-level control such as makeup style. A description of this fine-level control is provided in Amit H Bermano, Rinon Gal, Yuval Alaluf, Ron Mokady, Yotam Nitzan, Omer Tov, Oren Patashnik, and Daniel Cohen-Or. State-of-the-art in the architecture, methods and applications of stylegan. In Computer Graphics Forum, volume 41, pages 591-611. Wiley Online Library, 2022. Therefore, the method perturbs only those latent codes associated with deeper layers of StyleGAN, thereby restricting the adversarial faces to the identity preserving manifold. The method further constrains the latent code to stay close to its initial value $w_{inv}$ using the following regularization 238:

$$\mathcal{L}_{latent} = \|(w \odot m_{id}) - (w_{inv} \odot m_{id})\|_2, \tag{4}$$

where $\odot$ denotes element-wise product and $m_{id}$ is an identity preservation mask that is 0 for the initial layers and 1 only for the deeper layers of the latent code. StyleGAN has 18 layers, each having a dimension of 512. The identity preservation mask is set to 1 only from layer 8 to 18. Finally, combining the three loss functions, the total loss 226 is $$\mathcal{L}_{total} = \lambda_{adv}\mathcal{L}_{adv} + \lambda_{clip}\mathcal{L}_{clip} + \lambda_{latent}\mathcal{L}_{latent}, \tag{5}$$

where $\mu_{adv.}$, $\lambda_{clip}$ and $\lambda_{latent}$ are hyperparameters. Note that $\mathcal{L}_{adv}$ accounts for the adversarial objective in Eq. 1, while the text-guided makeup transfer ($\mathcal{L}_{clip}$) and identity-preserving regularization ($\mathcal{L}_{latent}$) implicitly enforce the naturalness constraint in Eq. 1.

Preferred embodiments use Style-GAN2 pretrained on the FFHQ face dataset as a generative model. A vision transformer-based CLIP model is used for adversarial guidance. The generator fine-tuning in the latent code initialization step uses 450 iterations with value of $\lambda_2$ in Eq. 2 set to 0.5. 40 text prompts are collected for the makeup text input based on the makeup style of diverse nature. For adversarial optimization, an Adam optimizer is used with $\beta_1$ and $\beta_2$ set to 0.9 and 0.999, respectively, and a learning rate of 0.01. The optimizer is run for 50 iterations to craft protected faces. The value of $\lambda_{adv.}$, $\lambda_{clip}$ and $\lambda_{latent}$ is set to 1, 0.5, and 0.01, respectively. All embodiments are conducted on a A100 GPU with 40 GB memory.

The embodiments are performed for both face verification and identification settings. An embodiment for face verification uses CelebA-HQ and LADN datasets for an impersonation attack. A subset of 1,000 images are selected from CelebA-HQ and average results are reported over 4 target identities provided by Shengshan Hu et al. Similarly, for LADN, the available 332 images are divided into 4 groups, where images in each group aim to impersonate the target identities provided by Shengshan Hu et al. For dodging attack, embodiments use CelebA-HQ and LFW datasets. Specifically, 500 subjects are selected at random and each subject has a pair of faces. Face identification: For impersonation and dodging, embodiments use CelebA-HQ and LFW as an evaluation set. For both datasets, 500 subjects are randomly selected, each with a pair of faces. One image is assigned in the pair to the gallery set and the other to the probe set. Both impersonation and dodging attacks are performed on the probe set. For impersonation, 4 target identities are inserted provided by Shengshan Hu et al. into the gallery set. A more detailed description of all datasets and pre-processing steps is provided below.

Embodiments aim to protect user facial privacy by attacking four FR model with diverse back bones in the black-box settings. The target models include IRSE50, IR152, FaceNet, and MobileFace. See Jie Hu, Li Shen, and Gang Sun. Squeeze-and-excitation networks. In *Proceedings of the IEEE conference on computer vision and pattern recognition*, pages 7132-7141, 2018; Jiankang Deng, Jia Guo, Niannan Xue, and Stefanos Zafeiriou. Arcface: Additive angular margin loss for deep face recognition. In *Proceedings of the IEEE/CVF conference on computer vision and pattern recognition*, pages 4690-4699, 2019; Florian Schroff, Dmitry Kalenichenko, and James Philbin. Facenet: A unified embedding for face recognition and clustering. In *Proceedings of the IEEE conference on computer vision and pattern recognition*, pages 815-823, 2015; and Sheng Chen, Yang Liu, Xiang Gao, and Zhen Han. Mobile-facenets: Efficient cnns for accurate real-time face verification on mobile devices. In *Chinese Conference on Biometric Recognition*, pages 428-438. Springer, 2018, each incorporated herein by reference in their entirety. Following standard protocol, images are aligned and cropped using MTCNN before giving them as input to FR models. See Kaipeng Zhang, Zhanpeng Zhang, Zhifeng Li, and Yu Qiao. Joint face detection and alignment using multitask cascaded convolutional networks. *IEEE signal processing letters,* 23 (10): 1499-1503, 2016, incorporated herein by reference in its entirety, for description of aligning and cropping. Further, privacy protection performance is reported based on commercial FR API including Face++ and Tencent Yunshentu FR platforms.

Following Yang et al., protection success rate (PSR) is used to evaluate the proposed approach. PSR is defined as the fraction of protected faces missclassified by the malicious FR system. PSR is evaluated using the thresholding and closed set strategies for face verification and identification, respectively. For face identification, Rank-N targeted identity success rate (Rank-NT) and untargeted identity success rate (Rank-N-U) are used, where Rank-N-T means that target image $x^t$ will appear at least once in the top N candidates shortlisted from the gallery and Rank-N-U implies that the top N candidate list does not have the same identity as that of original image x. Results of PSNR (dB), SSIM, and FID scores are reported to evaluate the imperceptibility of the method. For a description of measuring imperceptibility, see Martin Heusel, Hubert Ramsauer, Thomas Unterthiner, Bernhard Nessler, and Sepp Hochreiter. Gans trained by a two time-scale update rule converge to a local nash equilibrium. *Advances in neural information processing systems,* 30, 2017, incorporated herein by reference in its entirety. Large PSNR and SSIM indicates better match with the original images, while low FID score indicates more realistic images. For a description of image quality assessment see Zhou Wang, Alan C Bovik, Hamid R Sheikh, and Eero P Simoncelli. Image quality assessment: from error visibility to structural similarity. *IEEE transactions on image processing,* 13 (4): 600-612, 2004, incorporated herein by reference in its entirety. For commercial APIs, the confidence score returned by the respective servers can be directly reported.

The present method is compared with other noise-based and makeup based facial privacy protection approaches. Noise based methods include PGD, MI-FGSM, TI-DIM, and TIP-IM, whereas makeup-based approaches are Adv-Makeup and AMTGAN. For a description of noise-based methods and makeup-based methods see Aleksander Madry, Aleksandar Makelov, Ludwig Schmidt, Dimitris Tsipras, and Adrian Vladu. Towards deep learning models resistant to adversarial attacks. In *Proceedings of the 6th International Conference on Learning Representations* (*ICLR*'18), 2018; Yinpeng Dong, Fangzhou Liao, Tianyu Pang, Hang Su, Jun Zhu, Xiaolin Hu, and Jianguo Li. Boosting adversarial attacks with momentum. In *Proceedings of the* 2018 *IEEE/CVF Conference on Computer Vision and Pattern Recognition* (*CVPR*'18), pages 9185-9193, 2018; Yinpeng Dong, Tianyu Pang, Hang Su, and Jun Zhu. Evading defenses to transferable adversarial examples by translation-invariant attacks. In *Proceedings of the* 2019 *IEEE/CVF Conference on Computer Vision and Pattern Recognition* (*CVPR*'19), pages 4312-4321, 2019; Yang et al., Bangjie Yin et al., *Proceedings of the* 30*th International Joint Conference on Artificial Intelligence* (*IJCAI*'21); and Shengshan Hu et al., each incorporated herein by reference in their entirety. It should be noted that TIP-IM and AMTGAN are considered the state-of-the-art (SOTA) for face privacy protection against black-box FR systems in noise-based and unrestricted settings, respectively. TIP-IM also incorporate multi-target objective in its optimization to find the optimal target image among multiple targets. For fair comparison, its single target variant is used.

Results are provided in black-box settings on four different pretrained FR models under face verification and identification tasks. To generate protected images, three FR models are used as a surrogate to imitate the decision boundary of the fourth FR model. All results are averaged over 5 text based makeup styles described further below.

For face verification experiments, the system threshold value is set at 0.01 false match rate for each FR model i.e., IRSE50 (0.241), IR152 (0.167), FaceNet (0.409), and MobileFace (0.302). Quantitative results in terms of PSR for impersonation attack under the face verification task are shown in Table 2. The present method is able to achieve an average absolute gain of about 12% and 14% over SOTA unrestricted and noise-based facial privacy protection methods, respectively. See Shengshan Hu et al. and Yang et al. for a description of SOTA unrestricted and noise-based facial privacy protection methods. Qualitative results are shown in FIG. 1 which shows that protected faces generated by the disclosed method are more realistic. Results for dodging attacks under face verification are provided below. Table 3 provides PSR vales under the face identification task for dodging (untargeted) and impersonation attacks. The disclosed method consistently outperforms other methods at both Rank-1 and Rank-5 settings. It is noted that this disclosure is the first to show effectiveness of generative models in offering untargeted privacy protection (dodging) in a more practical identification setting. Since AMT-GAN and Adv-Makeup are originally trained to impersonate target identity under the verification task, they are not included in Table 3. Qualitative results for LFW and CelebA are provided below.

TABLE 2

Protection success rate (PSR %) of black-box impersonation attack under the face verification task. For each column, the other three FR systems are used as surrogates to generate the protected faces.

| | CelebA-HQ | | | | LADN-Dataset | | | | |
|---|---|---|---|---|---|---|---|---|---|
| Method | IRSE50 | IR152 | FaceNet | MobileFace | IRSE50 | IR152 | FaceNet | MobileFace | Average |
| Clean | 7.29 | 3.80 | 1.08 | 12.68 | 2.71 | 3.61 | 0.60 | 5.11 | 4.61 |
| Inverted | 5.57 | 2.77 | 0.60 | 13.32 | 6.80 | 4.51 | 0.25 | 11.66 | 5.68 |

TABLE 2-continued

Protection success rate (PSR %) of black-box impersonation attack under the face verification task. For each column, the other three FR systems are used as surrogates to generate the protected faces.

| | CelebA-HQ | | | | LADN-Dataset | | | | |
|---|---|---|---|---|---|---|---|---|---|
| Method | IRSE50 | IR152 | FaceNet | MobileFace | IRSE50 | IR152 | FaceNet | MobileFace | Average |
| PGD | 36.87 | 20.68 | 1.85 | 43.99 | 40.09 | 19.59 | 3.82 | 41.09 | 25.60 |
| MI-FGSM | 45.79 | 25.03 | 2.58 | 45.85 | 48.90 | 25.57 | 6.31 | 45.01 | 30.63 |
| TI-DIM | | 63.63 | 36.17 | 15.30 | 57.12 | 56.36 | 34.18 | 22.11 | 48.30 | 41.64 |
| Adv-Makeup$_{(IJCAI'21)}$ | 21.95 | 9.48 | 1.37 | 22.00 | 29.64 | 10.03 | 0.97 | 22.38 | 14.72 |
| TIP-IM$_{(ICCV'21)}$ | 54.40 | 37.23 | 40.74 | 48.72 | 65.89 | 43.57 | 63.50 | 46.48 | 50.06 |
| AMT-GAN$_{(CVPR'22)}$ | 76.96 | 35.13 | 16.62 | 50.71 | 89.64 | 49.12 | 32.13 | 72.43 | 52.84 |
| Ours | 81.10 | 48.42 | 41.72 | 75.26 | 91.57 | 53.31 | 47.91 | 79.94 | 64.90 |

See Madry et al.; Dong et al. (2018); Dong et al. (2019); Yin et al.; Yang et al.; and Shengshan Hu et al., each incorporated herein by reference in their entirety.

TABLE 3

Protection success rate (PSR %) of black-box dodging (top) and impersonation (bottom) attacks under the face identification task for LFW dataset. See Huang et al. For each column, the other three FR systems are used as surrogates to generate the protected faces. R1-U: Rank-1-Untargeted, R5-U: Rank-5-Untargeted, R1-T: Rank-1-Targeted, R5-T: Rank-5-Targeted.

| Method | IRSE50 | | IR152 | | FaceNet | | MobileFace | | Average | |
|---|---|---|---|---|---|---|---|---|---|---|
| | R1-U | R5-U | R1-U | R5-U | R1-U | R5-U | R1-U | R5-U | R1-U | R5-U |
| MI-FGSM | 70.2 | 42.6 | 58.4 | 41.8 | 59.2 | 34.0 | 68.0 | 47.2 | 63.9 | 41.4 |
| TI-DIM | 79.0 | 51.2 | 67.4 | 54.0 | 74.4 | 52.0 | 79.2 | 61.6 | 75.0 | 54.7 |
| TIP-IM$_{(ICCV'21)}$ | 81.4 | 52.2 | 71.8 | 54.6 | 76.0 | 49.8 | 82.2 | 63.0 | 77.8 | 54.9 |
| Ours | 86.6 | 59.4 | 73.4 | 56.6 | 83.8 | 51.2 | 85.0 | 66.8 | 82.2 | 58.5 |
| | R1-T | R5-T | R1-T | R5-T | R1-T | R5-T | R1-T | R5-T | R1-T | R5-T |
| MI-FGSM | 4.0 | 10.2 | 3.2 | 14.2 | 9.0 | 18.8 | 8.4 | 22.4 | 6.15 | 16.4 |
| TI-DIM | 4.0 | 13.6 | 7.8 | 19.6 | 18.0 | 32.8 | 21.6 | 39.0 | 12.85 | 26.25 |
| TIP-IM$_{(ICCV'21)}$ | 8.0 | 28.2 | 11.6 | 31.2 | 25.2 | 56.8 | 34.0 | 51.4 | 19.7 | 41.9 |
| Ours | 11.2 | 37.8 | 16.0 | 51.2 | 27.4 | 54.0 | 39.0 | 61.2 | 23.4 | 51.05 |

See Dong et al. (2018); Dong et al. (2019); Yang et al.; Yin et al.; and Shengshan Hu et al.

FID scores (lower is better) for the disclosed method are provided in Table 4 for CelebA and LADN datasets to measure naturalness. Adv-Makeup has the lowest FID score as it only applies makeup to the eye region without changing the rest of the face. However, this kind of restriction results in poor PSR. The disclosed method has lower FID compared to TIP-IM and AMT-GAN and achieves the highest PSR. PSNR and SSIM results are provided below.

TABLE 4

FID comparison. PSR Gain is absolute gain in PSR relative to Adv-Makeup.

| Method | FID ↓ | PSR Gain ↑ |
|---|---|---|
| Adv-Makeup | 4.23 | 0 |
| TIP-IM | 38.73 | 35.34 |
| AMT-GAN | 34.44 | 38.12 |
| Ours | 26.62 | 50.18 |

See Yin et al.; Yang et al.; and Shengshan Hu et al.

Figure 4:
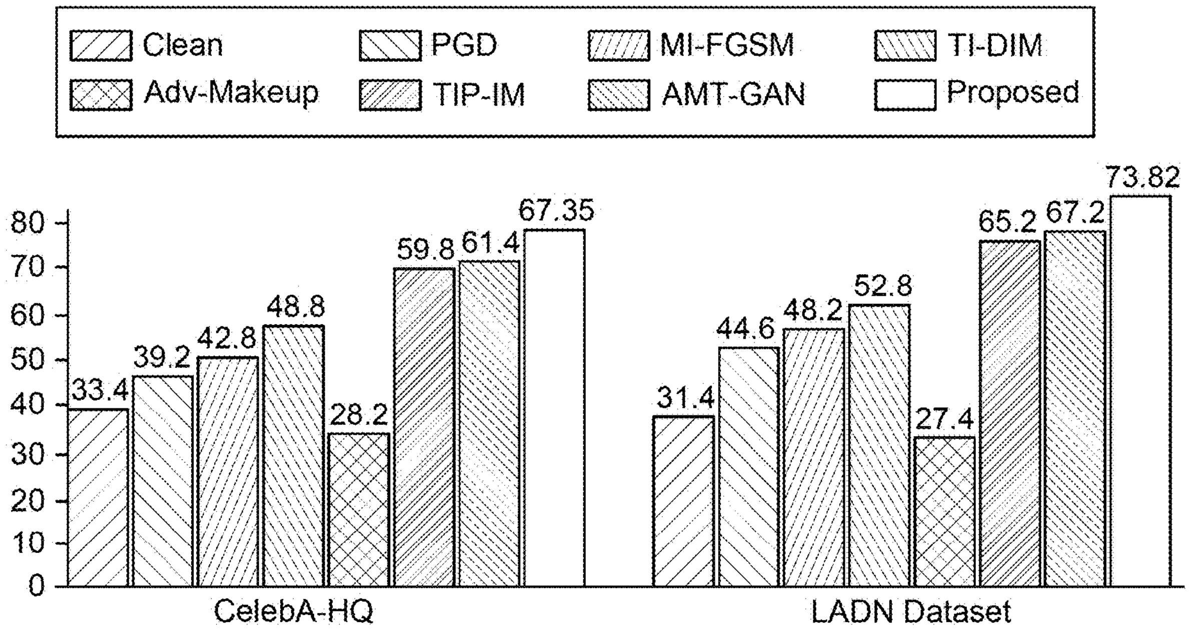
FIG. 4 is a chart of average confidence score (higher is better) returned by a real-world face verification API, Face++, for impersonation attack.

The present method is effective to protect facial images (through targeted impersonation) against commercial API such as Face++ and Tencent Yunshentu FR platform operating in the verification mode. These APIs return confidence scores between 0 to 100 to measure whether two images are similar or not, where a high confidence score indicates high similarity. As the training data and model parameters of these propriety FR models are unknown, it effectively mimics a real-world scenario. An implementation was made to protect 100 faces randomly selected from CelebA-HQ using the baselines and the disclosed method. FIG. 4 shows the average confidence score returned by Face++ against these images. These results indicate that the disclosed method has a high PSR compared to state-of-the-art makeup and noise-based facial privacy protection methods.

Next, some ablation studies are described to evaluate the contributions of loss components.

Figure 5:
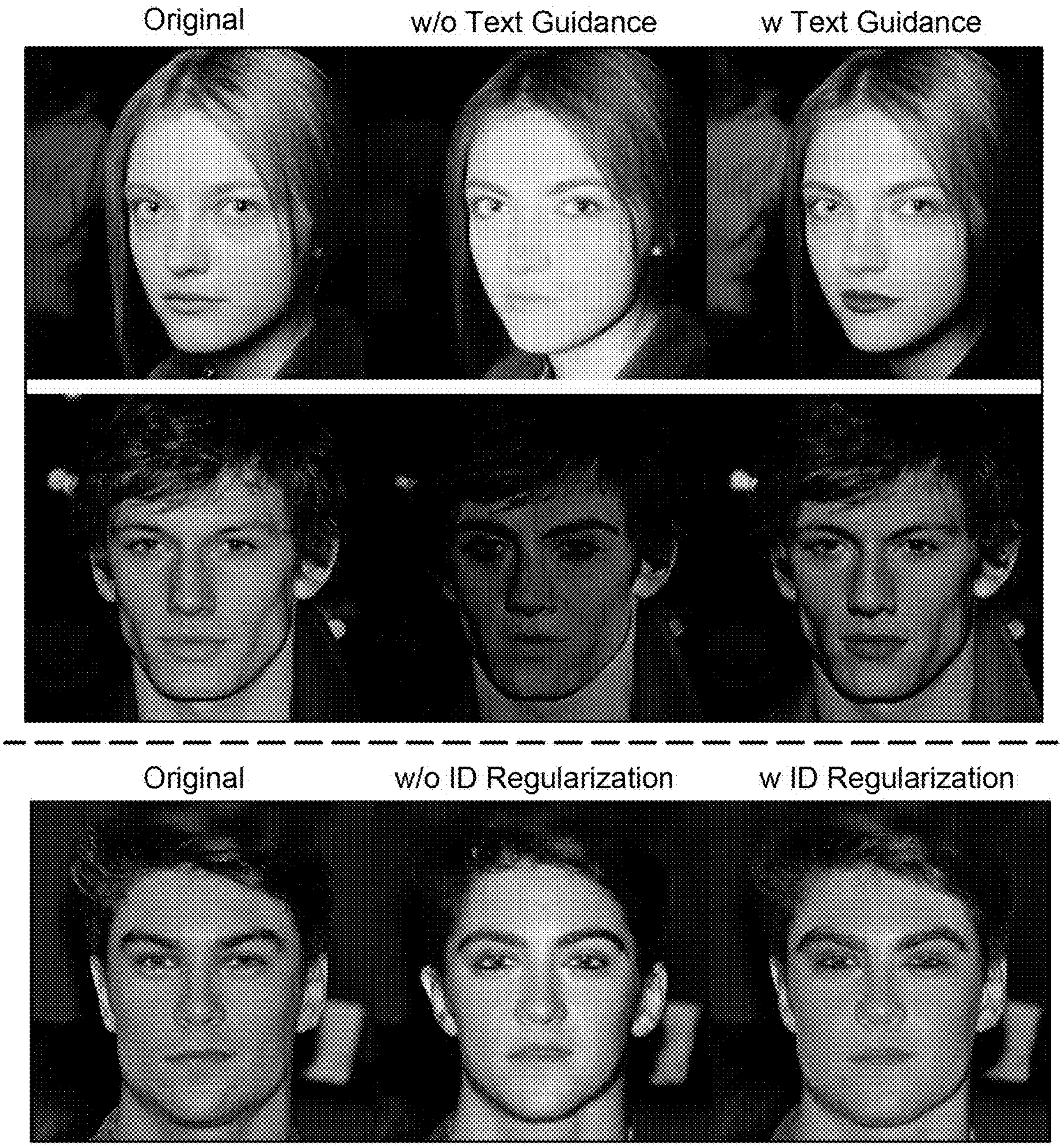
FIG. 5 are images illustrating an effect of makeup-based text guidance on visual quality of output images.

FIG. 5 are images illustrating an effect of makeup-based text guidance on visual quality of output images. The top row of FIG. 5 shows the effect of makeup-based text guidance on the visual quality of the output images. Output images are able to impersonate the target identity for face verification. Text-prompt is "tanned makeup with red lipstick". The bottom row of FIG. 5 shows that optimizing over all latent codes changes the identity of the protected image. The disclosed identity-preserving regularization enforces the adversarial optimization to search for latent codes that hide the perturbations in the makeup effect while simultaneously preserving visual identity.

In particular, as shown in the top row of FIG. 5, in the absence of text guidance, resulting images may contain artifacts due to increased perturbations induced by the adversarial objective. Text-guidance effectively hides the perturbations in the makeup, leading to more natural looking images. It also provides the user more flexibility to select a desired makeup style compared to a reference image.

Optimizing over the whole latent space provides more degrees of freedom and increases the PSR. However, it does not explicitly enforce adversarial optimization to preserve the user identity as shown in the bottom row of FIG. 5. The disclosed identity preserving regularization effectively preserves identity, while imitating the desire makeup style.

Decreasing the weight assigned to the latent loss $\lambda_{latent}$ results in an increase in both the FID score and PSR (and vice versa). Allowing the latent to deviate more from the initial inverted latent code of the given face image often results in artifacts caused by the adversarial loss, degrading naturalness but aiding privacy.

The impact of different textual styles on the PSR is evaluated. Five text-based makeup styles is selected to protect 1000 images of CelebA-HQ using the disclosed method. Results in Table 6 show that PSR does not change significantly (low standard deviation) for different makeup styles, indicating robustness of the disclosed method wrt different text-based makeup styles.

TABLE 5

Impact of λlatent on FID score and PSR.

| $\lambda_{latent}$ | 0.5 | 0.1 | 0.05 | 0.01 | 0.005 | 0.0001 | 0 |
|---|---|---|---|---|---|---|---|
| FID | 11.6 | 21.4 | 25.2 | 27.8 | 30.1 | 38.4 | 43.2 |
| PSR (%) | 31.2 | 39.0 | 57.4 | 76.2 | 83.8 | 90.0 | 93.6 |

TABLE 6

Impact of different textual makeup styles on PSR. Makeup styles are "tanned", "pale", "pink eyeshadows", "red lipstick", and "Matte".

| | $t_{makeup}^1$ | $t_{makeup}^2$ | $t_{makeup}^3$ | $t_{makeup}^4$ | $t_{makeup}^5$ | Std. |
|---|---|---|---|---|---|---|
| PSR | 74.1 | 77.3 | 78.4 | 78.7 | 79.2 | 1.24 |

Std. denotes standard deviation.

Details of the method are provided, including further details of the makeup text prompts, a description of datasets along with preprocessing steps, and additional experiments under face verification and identification tasks. A comparison of quantitative results are provided in terms of PSNR and SSIM with baseline methods, followed by the effectiveness of the disclosed method against commercial FR API of Tencent.

Figure 6:
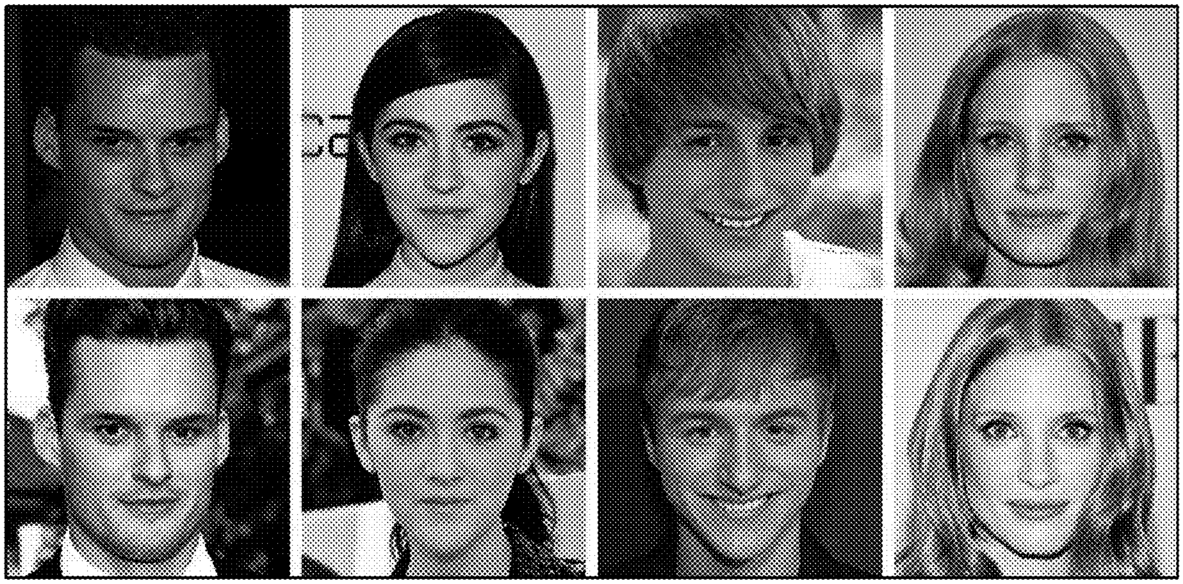
FIG. 6 are images illustrating target identities for impersonation attack under face verification task.

FIG. 6 provides an example to show the effectiveness of the disclosed method. In particular, FIG. 6 shows target identities used by Shengshan Hu et al. for impersonation attack under a face verification task. The top row in FIG. 6 represents images used during training, and the bottom row shows images used for evaluation. It mimics a realistic scenario in which target images used in the optimization phase differ from those during evaluation.

With regard to details of the makeup text prompts, 40 makeup text styles have been collected from online resources to guide the adversarial optimization in the disclosed method. A list of these makeup text styles are provided in Table 7.

TABLE 7

Makeup text styles used in experiments.

| | Makeup Text |
|---|---|
| 1 | Tanned makeup |
| 2 | Pale makeup |
| 3 | Makeup |
| 4 | Heavy makeup |
| 5 | Heavy makeup with red lipstick |
| 6 | Makeup with purple lipstick |
| 7 | Funky makeup |
| 8 | Celebrity makeup |
| 9 | Dewy makeup |
| 10 | Matte makeup |
| 11 | Light makeup with pink eyeshadows |
| 12 | Soft glam makeup |
| 13 | Retro makeup |
| 14 | Ultra glamm makeup |
| 15 | Vintage makeup |
| 16 | Shimmer powder makeup |
| 17 | HD makeup |
| 18 | Editorial makeup |
| 19 | Avant Garde Makeup |
| 20 | Drag Queen Makeup |
| 21 | Smokey makeup |
| 22 | No makeup |
| 23 | Plak eyeshadows |
| 24 | Clown makeup |
| 25 | Tanned Makeup with black lipstick |
| 26 | Vintage makeup |
| 27 | Big eyebrows with pink eyeshadows |
| 28 | Tanned makeup with purple lipstick |
| 29 | Red lipstick with purple eyeshadows |
| 30 | Pale makeup with red lipstick |
| 31 | Black eyeshadows with purple lipstick |
| 32 | Rosy cheeks makeup |
| 33 | Tanned Makeup with red lipstick |
| 34 | Purple cheeks makeup with pink lipstick |
| 35 | Big eyebrows |
| 36 | Bridal makeup |
| 37 | Anti-Aging makeup |
| 38 | Clown makeup with purple lipstick |
| 39 | Gothic makeup |
| 40 | Big eyelashes with pink eyeshadows |

A detailed description of the datasets used in the embodiments along with the preprocessing steps are provided. The method uses CelebA-HQ and LADN datasets for impersonation attack under the face verification tasks. For other settings, CelebA-HQ and LFW datasets are used. The datasets demonstrate the generalization of the disclosed method on both high-quality (CelebA-HQ) and low-quality (LFW) face images, as the generative models that are used are trained on high-quality images.

CelebA-HQ is a high-resolution version of CelebA dataset and consists of 30,000 images having resolution of 1024×1024. 1000 images are used from CelebA-HQ correspond to different identities as provided by Shengshan Hu et al.

LADN is a makeup-based dataset consisting of 333 non-makeup images and 302 makeup images. LADN is used for impersonation attack under the face verification task only. Similar to Shengshan Hu et al., 332 images are used from the non-makeup images. These images are split into four groups, where images in each group aim to impersonate the same target identity. For experimentation, the four target identities provided by Shengshan Hu et al. are used.

LFW is a widely used face identification dataset consisting of 13,233 images and 5,749 identities. The method uses LFW for face verification (dodging) and face identification (impersonation and dodging) tasks. For experiments, 500 pairs are selected, where each pair belongs to the same identity. For identification, one image in the pair is assigned to the gallery set and the other to the probe set. Both impersonation and dodging attacks are performed on the probe set.

With regard to preprocessing, consistent with the previous works, MTCNN is used to detect, crop and align the face image before giving it as input to FR models. For all datasets, preprocessing follows the official paper for the latent code initialization stage, of Omer Tov, Yuval Alaluf, Yotam Nitzan, Or Patashnik, and Daniel Cohen-Or. Designing an encoder for stylegan image manipulation. *ACM Transactions on Graphics* (*TOG*), 40 (4): 1-14, 2021, incorporated herein by reference in its entirety.

TABLE 8

Protection success rate (PSR %) of black-box dodging attack under the face verification task. For each column, the later three FR systems are used as surrogates to generate the protected faces.

| | CelebA-HQ | | | | LFW | | | | |
|---|---|---|---|---|---|---|---|---|---|
| Method | IRSE50 | IR152 | FaceNet | MobileFace | IRSE50 | IR152 | FaceNet | MobileFace | Average |
| TIP-IM$_{(ICCV'21)}$ | 71.2 | 69.4 | 88.2 | 59.0 | 71.8 | 76.1 | 80.6 | 62.9 | 72.4 |
| Ours | 83.4 | 83.6 | 93.5 | 62.8 | 79.6 | 80.2 | 86.5 | 73.3 | 80.4 |

For a further description of the attack, see Xiao Yang, Yinpeng Dong, Tianyu Pang, Hang Su, Jun Zhu, Yuefeng Chen, and Hui Xue. Towards face encryption by generating adversarial identity masks. In *Proceedings of the* 2021 *IEEE/CVF International Conference on Computer Vision* (*ICCV'*21), pages 3897-3907, 2021, incorporated herein by reference in its entirety.

TABLE 9

Protection success rate (PSR %) of black-box dodging (top) and impersonation (bottom) attacks under the face identification task for CelebA-HQ dataset, as further described in Huang et al. For each column, the later three FR systems are used as surrogates to generate the protected faces. R1-U: Rank-1-Untargeted, R5-U: Rank-5-Untargeted, R1-T: Rank-1-Targeted, R5-T: Rank-5-Targeted.

| Method | IRSE50 | | IR152 | | FaceNet | | MobileFace | | Average | |
|---|---|---|---|---|---|---|---|---|---|---|
| | R1-U | R5-U | R1-U | R5-U | R1-U | R5-U | R1-U | R5-U | R1-U | R5-U |
| TIP-IM$_{(ICCV'21)}$ | 79.6 | 61.2 | 62.9 | 42.8 | 46.2 | 27.8 | 81.9 | 76.7 | 67.6 | 52.1 |
| Ours | 88.5 | 72.3 | 69.0 | 46.2 | 58.5 | 31.7 | 94.7 | 82.6 | 77.7 | 58.2 |
| | R1-T | R5-T | R1-T | R5-T | R1-T | R5-T | R1-T | R5-T | R1-T | R5-T |
| TIP-IM$_{(ICCV'21)}$ | 16.2 | 51.4 | 21.2 | 56.0 | 8.1 | 35.8 | 9.6 | 24.0 | 13.8 | 41.8 |
| Ours | 24.5 | 64.7 | 24.2 | 65.2 | 12.5 | 38.7 | 11.8 | 28.2 | 18.2 | 49.2 |

Results of dodging attack under the face verification task are provided for CelebA-HQ and LFW datasets. The result of the impersonation attack under the verification task is provided above. For embodiments, 500 subjects are selected at random, and each subject has a pair of faces. Quantitative results in terms of Protection Success Rate (PSR) under a black-box setting are shown in Table 4. As Adv-Makeup and AMT-GAN are trained for the impersonation attack, these are not included in the comparison.

TABLE 10

Protection success rate (PSR %) of black-box dodging attack under the face verification task. For each column, the other three FR systems are used as surrogates to generate the protected faces.

| Method | PSNR | SSIM |
|---|---|---|
| TIP-IM$_{(ICCV'21)}$ | 33.21 | 0.92 |
| AMT-GAN$_{(CVPR'22)}$ | 19.50 | 0.79 |
| Ours | 19.31 | 0.75 |

Results of targeted (impersonation) and untargeted (dodging) attacks are provided on CelebA-HQ dataset under the task of face identification. For the embodiment, 500 subjects are randomly selected, each with a pair of faces. One image in the pair is assigned to the gallery set and the other to the probe set. Both impersonation and dodging attacks are performed on the probe set. Quantitative results in terms of Protection Success Rate (PSR) under a blackbox setting are shown in Table 9. For impersonation, four target identities are inserted provided by Shengshan Hu et al. into the gallery set. The results on LFW dataset under the same settings are provided above.

With regard to a comparison of quantitative results, quantitative results are provided in terms of PSNR and SSIM. The disclosed method has inferior performance compared to TIP-IM and comparable performance to AMT-GAN for PSNR and SSIM. However, as shown in Table 4, above, the disclosed method has a lower FID score, indicating that the outputs generated via the disclosed method have a more natural appearance.

Figure 8:
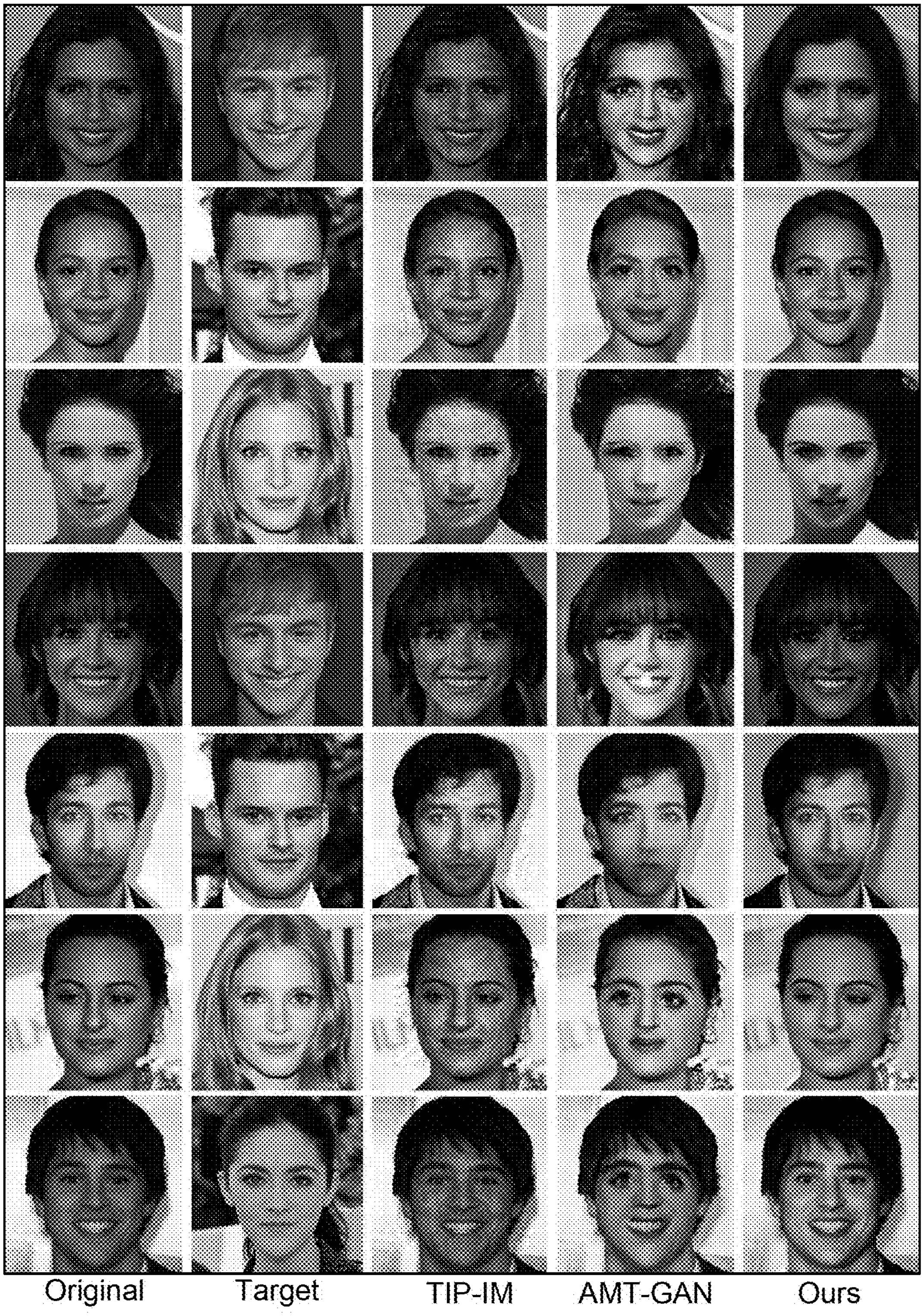
FIG. 8 are images illustrating qualitative results generated by TIP-IM, AMT-GAN and the disclosed approach for black-box impersonation attack under the face verification task.

FIG. 8 are images illustrating qualitative results generated by TIP-IM, AMT-GAN and the disclosed approach for black-box impersonation attack under the face verification task. FIG. 8. Qualitative results generated by TIP-IM, AMT-GAN and the present method for black-box impersonation attack under the face verification task. The first two columns are the original images and the target identity. From top to bottom, the text makeup styles used in the disclosed method are "purple lipstick", "red lipstick", "pink lipstick with big eyebrows", "tanned makeup", "pink lipstick", "pale makeup with pink eyeshadows", and "pale makeup with pink lipstick".

The drop in PSNR and SSIM compared to AMT-GAN can be due to the error between the original image and the inverted image during the GAN inversion (latent code initialization) stage. The progress in the GAN inversion field can help reduce this error. See Weihao Xia, Yulun Zhang, Yujiu Yang, Jing-Hao Xue, Bolei Zhou, and Ming-Hsuan Yang. Gan inversion: A survey. *IEEE Transactions on Pattern Analysis and Machine Intelligence,* 2022, incorporated herein by reference in its entirety.

Figure 7:
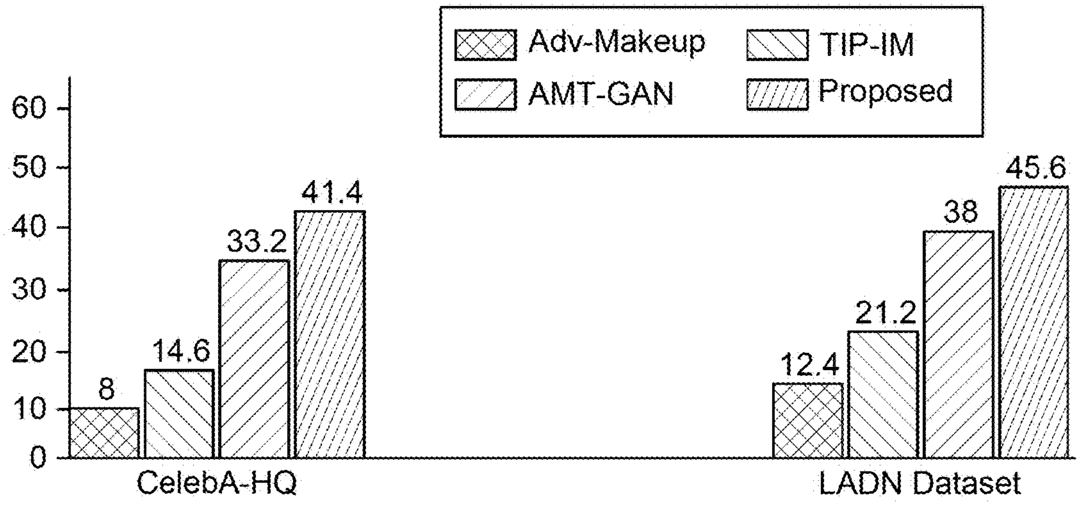
FIG. 7 is a chart of average confidence score (higher is better) returned by a real-world face verification API, Tencent, for impersonation attack.

Tencent face comparison API returns confidence scores between 0 to 100 to measure whether two images are similar or not, where a high confidence score indicates high similarity. As the training data and model parameters of these propriety FR models are unknown, it effectively mimics a real-world scenario. 100 faces for protection that are randomly selected from CelebA-HQ and LADN datasets using the baselines and the proposed method. FIG. 7 is a chart of average confidence score (higher is better) returned by a real-world face verification API, Tencent, for impersonation attack.

In particular, FIG. 7 shows the average confidence score returned by Tencent face comparison API against these images. The results indicate that the disclosed method has a high Protection Success Rate compared to baselines. The present method has a higher confidence score than state-of-the-art makeup and noise-based facial privacy protection methods.

Embodiments take around 70 seconds to protect a single high-resolution image of size 1024×1024 on A100 GPU with 40 GB memory. The latent code initialization stage takes around 50 seconds, and the text-guided adversarial optimization stage takes about 20 seconds. On the other hand, although it takes less than a second for AMT-GAN to protect a high-resolution image, it requires re-training of around 13 hours every time for a new target identity. As the disclosed method is generative, therefore it can be quickly adapted to different target identities at test time without computationally expensive model re-training.

In an alternative embodiment, the iterative latent code initialization stage can be replaced with a single forward pass following the recent works regarding trainable mapper-based generator fine-tuning, as discussed in Yuval Alaluf, Omer Tov, Ron Mokady, Rinon Gal, and Amit Bermano. Hyperstyle: Stylegan inversion with hypernetworks for real image editing. In *Proceedings of the IEEE/CVF Conference on Computer Vision and Pattern Recognition*, pages 18511-18521, 2022; and Tan M Dinh, Anh Tuan Tran, Rang Nguyen, and Binh-Son Hua. Hyperinverter: Improving stylegan inversion via hypernetwork. In *Proceedings of the IEEE/CVF Conference on Computer Vision and Pattern Recognition*, pages 11389-11398, 2022, each incorporated herein by reference in their entirety. This replacement can considerably reduce the execution time of the disclosed method.

Makeup-Guided Facial Privacy Protection via Untrained Neural Network Priors

Several studies have explored adversarial attacks to protect facial privacy, but these often struggle to balance naturalness and privacy protection. Table 11 provides a comparison of these studies.

TABLE 11

Comparison of facial privacy protection methods across output naturalness, black-box transferability, verification/identification performance, and unrestricted (semantically meaningful) examples, and use of reference images.

| | Adv-Makeup | TIP-IM | AMT-GAN | CLIP2Protect | DFPP (Ours) |
|---|---|---|---|---|---|
| Natural outputs | Yes | Partially | Partially | Yes | Yes |
| Black box | Yes | Yes | Yes | Yes | Yes |
| Verification | Yes | No | Yes | Yes | Yes |
| Identification | No | Yes | No | Yes | Yes |
| Unrestricted | Yes | No | Yes | Yes | Yes |
| Reference Img. | Yes | No | Yes | No | Yes |

Regarding Adv-Makeup, see Yin, B., Wang, W., Yao, T., Guo, J., Kong, Z., Ding, S., Li, J., Liu, C.: Adv-makeup: A new imperceptible and transferable attack on face recognition. In: *Proceedings of the* 30*th International Joint Conference on Artificial Intelligence* (*IJCAI'*21). pp. 1252-1258 (2021); Regarding TIP-IM, see Yang, X., Dong, Y., Pang, T., Su, H., Zhu, J., Chen, Y., Xue, H.: Towards face encryption by generating adversarial identity masks. In: *Proceedings of the* 2021 *IEEE/CVF International Conference on Computer Vision* (ICCV'21). pp. 3897-3907 (2021); Regarding AMT-GAN, see Hu, S., Liu, X., Zhang, Y., Li, M., Zhang, L. Y., Jin, H., Wu, L.: Protecting facial privacy: Generating adversarial identity masks via style-robust makeup transfer. In: *Proceedings of the IEEE/CVF Conference on Computer Vision and Pattern Recognition*. pp. 15014-15023 (2022); each incorporated herein by reference in their entirety. CLIP2Protect is described above as the disclosed method.

These methods use generative adversarial networks trained on large makeup datasets to transfer makeup from a reference image to a user's face, imitating a target identity. Importantly, these makeup-based approaches learn effective image priors by capturing natural image statistics from large-scale makeup datasets. Nevertheless, despite their effectiveness, existing adversarial makeup transfer methods suffer from several limitations.

First, training on large makeup datasets is required to capture makeup statistics. These datasets are not only difficult to acquire, but also make these approaches susceptible to dataset bias, as prior information is generally limited to the statistics of the data used for training. Second, high-quality image generators are often hard to train. Third, adversarial toxicity can cause false matches in semantic correspondences, leading to unnatural makeup artifacts and changes in the perceived identity of the user image. While some methods use textual makeup guidance, this can be limiting for complex styles, and users may prefer reference images for finer control.

Above embodiments of the disclosed method, referred to as CLIP2Protect, rely on pre-trained models like StyleGAN for generating protected images. This dependency makes the above-disclosed method vulnerable to the inherent dataset biases of the pre-trained models, potentially leading to suboptimal performance across diverse demographics.

To address these issues, a further encoder-decoder-based method, Deep Facial Privacy Prior (DFPP), solely optimizes the weights of a randomly initialized neural network at test-time for natural-looking adversarial makeup transfer. The further method features a robust correspondence module for semantic alignment of reference and source images in the encoder's latent space, and a randomly initialized conditional decoder with Adaptive Makeup Conditioning (AMC) layers. The further method optimizes the decoder parameters at test-time to generate protected samples that retain (i) the source's human-perceived identity, (ii) adopt the reference image's makeup style, and (iii) mimic the target image identity to evade black-box FR models. To achieve these stated objectives, the further method includes a composite loss function with three preferred components: a Structural Consistency Loss that maintains source identity via patch-wise matching in a pre-trained ViT feature space, a Makeup Loss that facilitates effective makeup transfer by matching region-wise color distribution and global tone while preserving background regions, and an Adversarial Loss that ensures the protected sample's features match the target image in the FR model's feature space while distancing from the source image embedding.

Unlike conventional methods, DFPP avoids the need for large-scale training on makeup datasets, effectively mitigating dataset bias. Extensive experiments in face verification and identification tasks, under both impersonation and dodging scenarios, show that DFPP effectively evades malicious black-box FR models and commercial APIs. Additionally, the effectiveness of DFPP in protecting videos is demonstrated. For videos, the test-time optimization is leveraged by transferring weights learned from one frame to subsequent frames, achieving approximately 10 times computational efficiency without compromising privacy.

Figure 9:
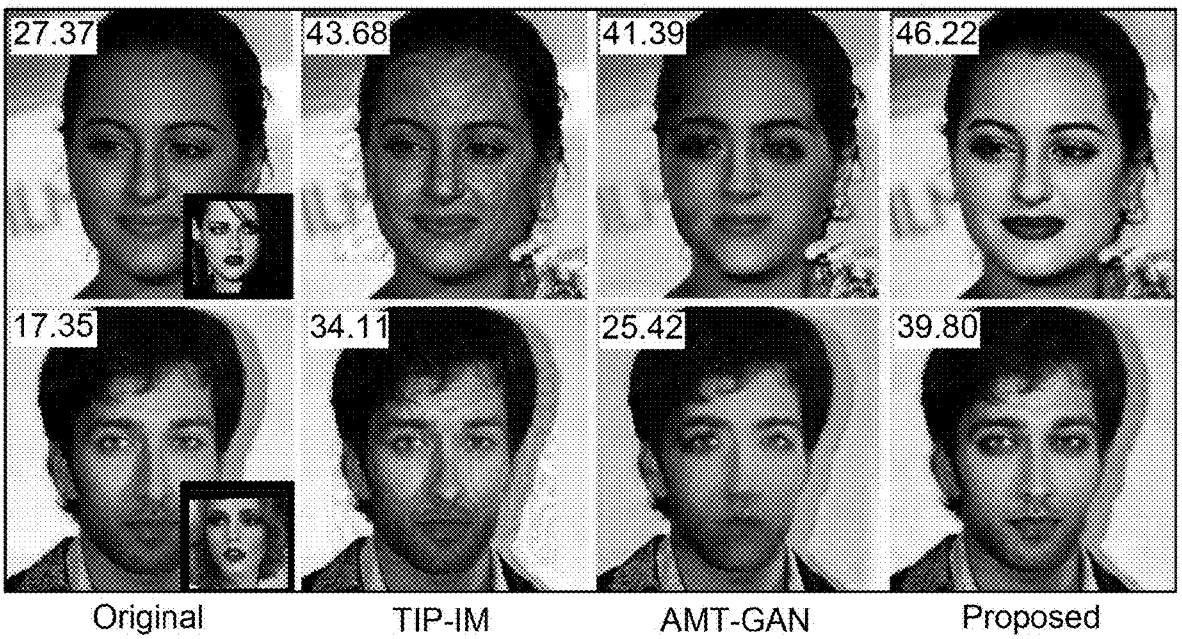
FIG. 9 are images illustrating generation of more natural protected faces for deceiving black-box face recognition systems.

FIG. 9 are images illustrating generation of more natural protected faces for deceiving black-box face recognition systems. The further method outperforms TIPIM and AMT-GAN, which are described in Yang et al. (2021); and Hu et al. (2022). The text annotations at the top-left of FIG. 9 shows the confidence score (higher is better) from a commercial API when matching the protected image to a false target identity.

Next, the protection settings and problem formulation are described.

With regard to protection settings, let $x \in \mathcal{X} \subset \mathbb{R}^n$ represent a face image, with its normalized feature representation extracted by an FR model as $f(x): \mathcal{X} \rightarrow \mathbb{R}^d$. A distance metric $\mathcal{D}(x_1, x_2)=D(f(x_1), f(x_2))$ measures dissimilarity between face images. FR systems operate in verification and identification modes. In verification, two faces are considered identical if $\mathcal{D}(x_1, x_2) \leq \tau$, where $\tau$ is the system threshold. In closed-set identification, the system compares a probe image to a gallery, identifying the most similar representation. User privacy can be protected by deceiving these malicious FR systems through impersonation or dodging attacks. Impersonation causes false matches with a target identity, while dodging prevents matches with the same person. These attack strategies apply to both verification and identification scenarios. As attackers can exploit both modes using black-box FR models, effective protection strategies must address all these aspects to comprehensively conceal user identity.

Given a source face image $x_s$, a goal is to create a protected face image $x_p$ that maximizes $\mathcal{D}(x_p, x_s)$ for successful dodging and minimizes $\mathcal{D}(x_p, x_t)$ for successful impersonation of a target face $x_t$, with $\mathcal{O}(x_s) \neq \mathcal{O}(x_t)$ where $\mathcal{O}$ provides true identity labels. The further method minimizes $\mathcal{H}(x_p, x_s)$, where $\mathcal{H}$ quantifies the degree of unnaturalness introduced in the protected image $x_p$. The further method can be formulated as an optimization problem:

$$\min_{x_p} \mathcal{L}(x_p) = \mathcal{D}(x_p, x_t) - \mathcal{D}(x_p, x_s) \text{ s.t. } \mathcal{H}(x_p, x_s) \leq \epsilon,$$

where $\epsilon$ denotes the bound on the adversarial perturbation. For noise-based approach, $\mathcal{H}(x_p, x_s)=\|x_s-x_p\|_p$, where $\|\cdot\|_p$ denotes the $\mathcal{L}_p$ norm. However, direct enforcement of the perturbation constraint leads to visible artifacts, which affects visual quality and user experience. Constraining the solution search space close to a natural image manifold by imposing an effective image prior can produce more realistic images. Note that the distance metric $\mathcal{D}$ is unknown since the goal is to deceive a black-box FR system.

Deep Facial Privacy Prior (DFPP) Workflow

The further method leverages the neural network's structure as a prior to generate protected facial images. Unlike conventional works that rely on pre-trained models or extensive datasets, the further method optimizes randomly initialized network parameters during inference via gradient descent, capturing an effective facial privacy prior without extensive task-specific training.

Figure 10:
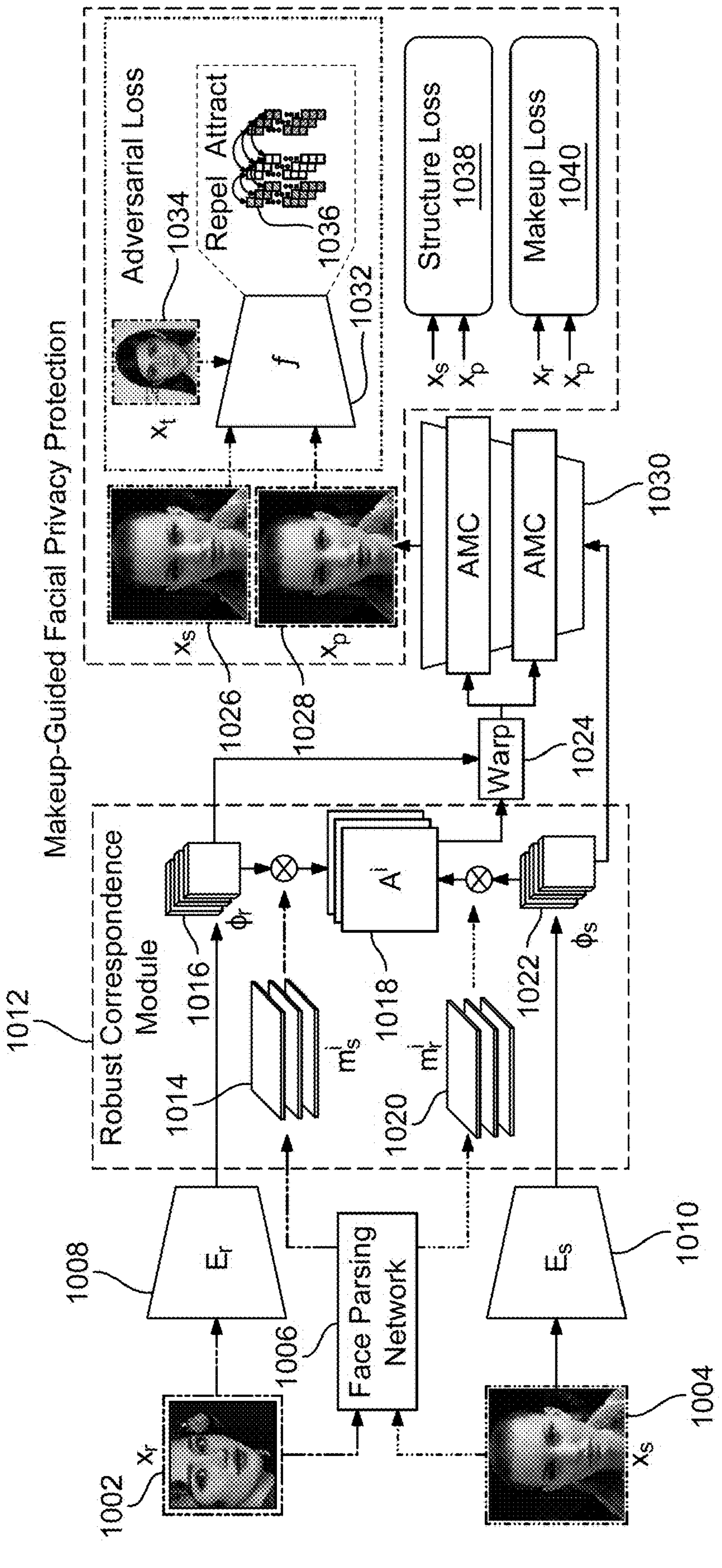
FIG. 10 is a diagram of an alternative workflow of a Deep Facial Privacy Prior (DFPP) framework.

FIG. 10 is a diagram of a workflow of the Deep Facial Privacy Prior (DFPP) framework. The further method employs an encoder-decoder architecture with randomly initialized parameters to adversarially transfer makeup from a reference to a source image, guided by a robust correspondence module. The conditional decoder then aligns the source image to match the reference image features via Adaptive Makeup Conditioning (AMC) layers. Notably, the untrained decoder is test-time finetuned using a structured, makeup, and adversarial losses to effectively protect facial privacy.

As shown in FIG. 10, the DFPP workflow consists of three key components. First, content encoder $E_s$ and makeup encoder $E_r$ extract multiscale features from source $x_s$ and reference $x_r$ images, respectively. Next, a region-constrained correspondence module establishes semantic correspondences between $x_s$ 1004 and $x_r$ 1002 in deep feature space. Finally, a conditional decoder $\mathcal{G}$ 1030 synthesizes the protected image $x_p$ 1028 using multi-scale features from the correspondence module. The randomly initialized decoder network is optimized at test-time using carefully designed identity preservation, makeup transfer, and adversarial losses. DFPP distinguishes itself from conventional makeup-based privacy protection methods by leveraging the network structure itself as a prior.

Network Architecture

With reference to FIG. 10, the architectural components are described, primarily focusing on the robust correspondence module and the conditional decoder.

With regard to the robust Correspondence Module, First, the source $x_s$ 1004 and makeup reference $x_r$ 1002 images are fed into multi-scale feature extractor networks, $E_s$ 1010 and $E_r$ 1008, respectively. These networks, pre-trained on ImageNet, extract deep features $\Phi_s=E_s(x_s)$ 1022 and $\Phi_r=E_r(x)$ 1012, both represented in $\mathbb{R}^{C \times H \times W}$, which are then reshaped to $\hat{\Phi}_s$ and $\hat{\Phi}_r$ in $\mathbb{R}^{HW \times C}$. These feature maps contain discriminative information representing the semantics of the inputs. A robust correspondence module then computes a dense semantic correspondence matrix $\mathcal{A} \in \mathbb{R}^{HW \times HW}$, which represents how pixels in $x_s$ 1004 are morphed from pixels in $x_r$ 1002. To avoid artifacts, makeup should be transferred between pixels with similar relative positions (e.g., lips to lips), reflected by high correlation values $\mathcal{A}(u, v)$ between these pixels.

A naive way to find the correlation (attention) matrix is to compare the similarity between the feature maps $\Phi_s$ 1022 and $\Phi_r$ 1012 as $$\mathcal{A}(u, v) = \frac{\hat{\Phi}_s(u)^T \hat{\Phi}_r(v)}{\|\hat{\Phi}_s(u)\| \|\hat{\Phi}_r(v)\|},$$

where $\hat{\Phi}_s(u) \in \mathbb{R}^{C\times 1}$ and $\hat{\Phi}_r(v) \in \mathbb{R}^{C\times 1}$ represent the channel-wise centralized features at position u and v, respectively. A description of the naïve approach is provided in He, M., Chen, D., Liao, J., Sander, P. V., Yuan, L.: Deep exemplar-based colorization. *ACM Transactions on Graphics* (*TOG*) 37 (4), 1-16 (2018), incorporated herein by reference in its entirety. Next, the reference features $\hat{\Phi}_r$ are warped 1024 to the source features $\hat{\Phi}_s$ according to $\mathcal{A}$, creating spatially aligned reference-to source features $\hat{\Phi}_{s\leftarrow r}$ as $\hat{\Phi}_{s\leftarrow r}(u) = \Sigma_v$ softmax $(\alpha \mathcal{A}(u, v))\, \hat{\Phi}_r(v)$, where $\alpha$ is the temperature parameter to control the sharpness of softmax across v. However, this naive approach often yields poor results due to false matches in semantic correspondence, especially in the presence of adversarial toxicity. In the case of the further method, this issue is particularly severe because there is only a single source and reference image to establish correspondence.

To address false matches due to adversarial toxicity, the further method spatially constrains semantic correspondences among facial regions of $x_s$ 1004 and $x_r$ 1002 in deep feature space, using facial parsing masks as guidance. Let $$m_s^i$$

1014 and $$m_r^i$$

1020 denote face parsing masks for $x_s$ and $x_r$, where i∈eye, lip, skin. Region-constrained deep features are obtained as $$\Phi_s^i = \Phi_s \odot m_s^i$$

1026 and $$\Phi_r^i = \Phi_r \odot m_r^i,$$

1016 where ⊙ is element-wise multiplication. Robust correspondences are established via correlation matrices:

$$\mathcal{A}^i(u, v) = \frac{\hat{\Phi}_s^i(u)^T \hat{\Phi}_r^i(v)}{\|\hat{\Phi}_s^i(u)\| \|\hat{\Phi}_r^i(v)\|}. \quad (1)$$

Using $\mathcal{A}^i$ 1018, the region constrained makeup features is spatially aligned with the corresponding source features via warping 1024 and concatenate them to obtain the final warped features $$\hat{\Phi}_s^{conc.}$$

after passing through a 1×1 convolution layer.

With regard to the conditional decoder 1030, guided by the final warped makeup features $$\hat{\Phi}_{s\leftarrow r}^{conc.}$$

and source features $\Phi_s$, the conditional decoder $\mathcal{G}_\theta$ 1030 generates protected image $x_p$ 1028 that respects the spatial semantic structure of $x_s$ 1004 and makeup style of $x_r$ as:

$$x_p = \mathcal{G}_\theta(\hat{\Phi}_{s\leftarrow r}^{conc.}, \Phi_s).$$

In order to effectively use the warped final makeup features to guide the generation, and to better preserve the makeup style information, the further method uses spatially-adaptive denormalization (SPADE) in Gθ. Spatially-adaptive denormalization is described in Park, T., Liu, M. Y., Wang, T. C., Zhu, J. Y.: Semantic image synthesis with spatially-adaptive normalization. In: *Proceedings of the IEEE/CVF conference on computer vision and pattern recognition*. pp. 2337-2346 (2019), incorporated herein by reference in its entirety. Specifically, the further method progressively injects $\Phi_s$ at different scales to modulate the activation functions of the SPADE block in $\mathcal{G}_\theta$. Unlike conventional works that employ fixed decoder parameters θ obtained after an intensive training process on a large makeup dataset, the further method initializes the parameters of the conditional decoder randomly and optimizes them during test-time to effectively capture the source-reference pair-specific prior guided by explicit content, makeup, and adversarial objective functions.

The overall objective function focuses on three important aspects of the protected image $x_p$ 1028: the structure loss 1038 ensures the preservation of the human-perceived identity from $x_s$ 1004; the makeup loss 1040 robustly transfers face makeup of $x_r$ 1002 to the relevant semantic regions of $x_s$ 1004, and adversarial loss 1036 generates effective adversarial perturbations to evade black-box FR models.

With regard to Structure Loss, conventional makeup transfer methods typically rely on perceptual loss in the VGG feature space to preserve the identity of the source face. A description of conventional makeup transfer methods is described in Nguyen, T., Tran, A. T., Hoai, M.: Lipstick ain't enough: beyond color matching for in-the-wild makeup transfer. In: *Proceedings of the IEEE/CVF Conference on computer vision and pattern recognition*. pp. 13305-13314 (2021), incorporated herein by reference in its entirety. However, this loss may suffer from two issues in the presence of adversarial toxicity. Firstly, it can cause distortion of the facial attributes of the source image. Secondly, a trade-off between preserving the original identity of $x_s$ and maintaining a high protection success rate may arise due to conflicting objectives. Inspired by findings that the deep features in the multi-head self-attention (MSA) layer of the pre-trained DINO-ViT contain crucial structural information, the further method introduces a revised structural loss function that effectively maintains the structural consistency between the $x_s$ and $x_p$. Specifically, the further method defines the structure loss as a difference in self-similarity $S(\cdot)$ of the keys extracted from the attention module at the deepest transformer layer. The revised structure loss 1038 can be expressed as:

$$\mathcal{L}_{struc}(x_s, s_p) = \|S^l(x_s) - S^l(x_p)\|_F, \quad (2)$$

where $$[S^l(x)]_{i,j} = \cos(k_i^l(x), k_j^l(x)).$$

Here, $$k_i^l(x) \text{ and } k_j^l(x)$$

represents $i^{th}$ and $j^{th}$ keys in the $l^{th}$ MSA layer of pre-trained ViT with image x and 'cos' denotes cosine similarity. The further method applies this revised structural loss in a patch-wise contrastive manner to ensure that keys at the same positions have closer distances while maximizing distances between keys at different positions. A description of the contrastive manner is provided in Jung, C., Kwon, G., Ye, J. C.: Exploring patch-wise semantic relation for contrastive learning in image-to-image translation tasks. In: *Proceedings of the IEEE/CVF conference on computer vision and pattern recognition*. pp. 18260-18269 (2022); and Park, T., Efros, A. A., Zhang, R., Zhu, J. Y.: Contrastive learning for unpaired image-to-image translation. In: *Computer Vision ECCV* 2020: 16*th European Conference*, Glasgow, UK, Aug. 23-28, 2020, Proceedings, Part IX 16. pp. 319-345. Springer (2020), each incorporated herein by reference in their entirety. This approach effectively preserves the source image's structure (identity) during adversarial optimization.

With regard to Robust Makeup Transfer Loss 1040, the primary objective of robust makeup transfer loss is to achieve adversarial makeup transfer between corresponding regions of $x_s$ 1004 and $x_r$ 1002, while maintaining global coherence and preventing artifacts in non-makeup areas (e.g., teeth, hair, background). To address challenges posed by adversarial toxicity during optimization, the further method employs two main components: a Histogram Matching Loss that matches color histograms in corresponding regions of source and reference makeup images, and a Global Loss that maintains the overall tone of the reference makeup style.

The Histogram Matching (HM) Loss applies color histogram matching to corresponding facial regions (skin, lips, and eyes) using face parsing masks. It aims to equalize the color distribution between regions of Xp and Xr. See Gu, S., Bao, J., Yang, H., Chen, D., Wen, F., Yuan, L.: Mask-guided portrait editing with conditional gans. In: *Proceedings of the IEEE/CVF conference on computer vision and pattern recognition*. pp. 3436-3445 (2019); and Li, T., Qian, R., Dong, C., Liu, S., Yan, Q., Zhu, W., Lin, L.: Beautygan: Instance-level facial makeup transfer with deep generative adversarial network. In: *Proceedings of the* 26*th ACM international conference on Multimedia*. pp. 645-653 (2018), each incorporated herein by reference in their entirety. Consequently, the HM loss is formulated as the weighted sum of the corresponding local regional losses and can be expressed as $\mathcal{L}_{HM} = \lambda_{lips}\mathcal{L}_{lips} + \lambda_{eyes}\mathcal{L}_{eyes} + \lambda_{skin}\mathcal{L}_{skin}$, where $\lambda_{lips}$, $\lambda_{eyes}$, and $\lambda_{skin}$ are hyperparameters. Specifically, each loss item is a local histogram loss, which can be written as:

$$\mathcal{L}_i = \|x_p \odot m_s^i - HM(x_s \odot m_s^i, x_r \odot m_r^i)\|, \quad (3)$$

where ⨀ is pixel-wise multiplication, and $m_s$ and $m_r$ are face parsing masks. The resulting histogram-matched regions form a pseudo-ground truth, providing coarse guidance during test-time adversarial optimization. While this discards spatial information, it offers sufficient guidance for makeup color transfer, which is crucial in the presence of adversarial toxicity.

The second component of the robust makeup transfer loss is the Global Loss, which ensures faithful transfer of global makeup elements from $x_r$ to $x_s$. Defined in a patch-wise and multi-scale manner for effective photorealistic transfer, it is expressed as:

$$\mathcal{L}_{glob} = \sum_l \sum_u \|\Psi((\Phi_{s\leftarrow r}^{conc.}(u)) - \Psi(\Phi_r(NN(u)))\|_F, \quad (4)$$

where $\Psi(\cdot)$ extracts local patches, and NN(u) is the index of the nearest patch in $\Phi_r$ to $\Psi(\Phi^{conc.}s\leftarrow r(u))$, found using a cross-correlation matrix. This matrix establishes the similarity between patches of source features and makeup face features. The overall robust makeup loss 1040 combines the histogram and global losses: $\mathcal{L}makeup = \mathcal{L}_{HM} + \mathcal{L}_{glob}$.

With regard to Adversarial Loss 1032, the further method optimizes the randomly initialized parameters of the untrained conditional decoder $\mathcal{G}_\theta$ 1030 to find a protected face $x_p$ 1028 whose feature representation is close to the target image $x_t$ 1034 and far from the original image $x_s$ 1004. This adversarial loss 1032 is expressed as:

$$\mathcal{L}_{adv} = \mathcal{D}(\mathcal{G}_\theta(\Phi_{s\leftarrow r}, \Phi_s), x_t) - \mathcal{D}(\mathcal{G}_\theta(\Phi_{s\leftarrow r}, \Phi_s), x_s), \quad (5)$$

where $\mathcal{D}(x_1, x_2) = 1 - \cos[f(x_1), f(x_2)]$ is the cosine distance. In the blackbox setting, the further method optimizes on an ensemble of white-box surrogate models to craft transferable attacks that mimic the unknown FR model's decision boundary.

Finally, combining all the loss functions, leads to $\mathcal{L}_{total} = \lambda_{struc}\mathcal{L}_{struc} + \lambda_{makeup}\mathcal{L}_{makeup} + \lambda_{adv}\mathcal{L}_{adv}$, where λ terms are hyperparameters. $\mathcal{L}_{struc}$ preserves the human perceived identity of the image, $\mathcal{L}_{makeup}$ ensures faithful makeup transfer in relevant regions, $\mathcal{L}_{adv}$ and accounts for the adversarial objective to fool malicious FR models.

In a preferred implementation, the further method uses the Adam optimizer $\beta_1=0.9$, $\beta_2=0.999$, learning rate $2\times10^{-4}$) for 450 iterations on A100 GPUs. The Adam optimizer is described in Kingma, D. P., Ba, J.: Adam: A method for stochastic optimization. *arXiv preprint arXiv:* 1412.6980 (2014), incorporated herein by reference in its entirety. Face parsing is done with BiSeNet, followed by mask smoothing to ensure a seamless transition around the edges. BiSeNet is described in Yu, C., Wang, J., Peng, C., Gao, C., Yu, G., Sang, N.: Bisenet: Bilateral segmentation network for real-time semantic segmentation. In: *Proceedings of the European conference on computer vision* (*ECCV*). *pp.* 325-341

(2018); and Masi, I., Mathai, J., AbdAlmageed, W.: Towards learning structure via consensus for face segmentation and parsing. In: *Proceedings of the IEEE/CVF Conference on Computer Vision and Pattern Recognition*. pp. 5508-5518 (2020), each incorporated herein by reference in their entirety.

With regard to Hyperparameters, the components of the loss functions are weighted as follows: structure loss ($\lambda_{viT}$=0.001), makeup loss ($\lambda_{hist}$=0.8, $\lambda_{glob}$=0.2), and adversarial loss ($\lambda_{adv}$=0.003).

The DFPP is compared with other proposed noise-based and makeup-based privacy protection approaches. Noise-based methods include PGD, MI-FGSM, TI-DIM, and TIP-IM, and makeup-based approaches include Adv-Makeup and AMT-GAN, which are described in Madry, A., Makelov, A., Schmidt, L., Tsipras, D., Vladu, A.: Towards deep learning models resistant to adversarial attacks. In: *Proceedings of the* 6*th International Conference on Learning Representations* (*ICLR*'18) (2018); Dong, Y., Pang, T., Su, H., Zhu, J.: Evading defenses to transferable adversarial examples by translation-invariant attacks. In: *Proceedings of the* 2019 *IEEE/CVF Conference on Computer Vision and Pattern Recognition* (*CVPR*'19). pp. 4312-4321 (2019); Yang et al. (2021); Yin et al., *Proceedings of the* 30*th International Joint Conference on Artificial Intelligence* (*IJCAI*'21); and Hu et al. (2022), each incorporated herein by reference in their entirety. TIP-IM also incorporate multi-target objective in its optimization to find the optimal target image among multiple targets. For fair comparison with AMT-GAN, TIPIM's single-target variant is used in main experiments. Multi-target results are also presented to demonstrate DFPP's effectiveness in such scenarios. The concept of multi-target is described in Hu et al. (2022). Main embodiments do not include methods requiring pre-trained high-quality generators like CLIP2Protect and DiffAM. Additionally, the method described above for CLIP2Protect is text-based, while the further method is image-based, making direct comparison less meaningful. However, CLIP2Protect is compared in a separate analysis to demonstrate that DFPP is less gender-biased.

For face verification, the CelebA-HQ and LADN datasets are used for the impersonation attack. See Karras, T., Aila, T., Laine, S., Lehtinen, J.: Progressive growing of gans for improved quality, stability, and variation. In: *International Conference on Learning Representations* (2018); and Gu, Q., Wang, G., Chiu, M. T., Tai, Y. W., Tang, C. K.: Ladn: Local adversarial disentangling network for facial makeup and de-makeup. In: *Proceedings of the IEEE/CVF International Conference on Computer Vision*. pp. 10481-10490 (2019), each incorporated herein by reference in their entirety. The embodiments follow the settings of AMT-GAN and select a subset of 1,000 images from CelebA-HQ, reporting average results over the 4 target identities provided by Hu et al. See Hu et al. (2022). Similarly, for LADN, the embodiments divide the 332 images into 4 groups, where images in each group aim to impersonate the target identities provided by Hu et al. For the dodging attack, the embodiments use CelebA-HQ and LFW datasets by selecting 500 subjects at random, where each subject has a pair of faces. See Karras et al. (2018); and Oarkhi et al. For face identification, the embodiments use CelebA-HQ and LFW as an evaluation set for both impersonation and dodging attacks. See Karras et al. (2018); and Huang, G. B., Mattar, M., Berg, T., Learned-Miller, E.: Labeled faces in the wild: A database for studying face recognition in unconstrained environments. In: *Workshop on faces in 'Real-Life' Images: detection, alignment, and recognition* (2008), each incorporated herein by reference in their entirety. For both datasets, the embodiments randomly select 500 subjects, each with a pair of faces. One image is assigned in the pair to the gallery set and the other to the probe set. Both impersonation and dodging attacks are performed on the probe set. For impersonation, 4 target identities, e.g., target identities provided by Hu et al. (2022) are inserted into the gallery set. All embodiments use 10 reference makeup images provided by Hu et al. (2022) Regarding pre-processing, MTCNN is used to detect, crop and align the face image before giving it as input to FR models. MTCNN is described in Zhang, K., Zhang, Z., Li, Z., Qiao, Y.: Joint face detection and alignment using multitask cascaded convolutional networks. *IEEE signal processing letters* 23 (10), 1499-1503 (2016), incorporated herein by reference in its entirety.

With regard to target models, the effectiveness of DFPP is evaluated against four black-box FR models: IRSE50, IR152, FaceNet, and MobileFace, which are described in Hu, J., Shen, L., Sun, G.: Squeeze-and-excitation networks. In: *Proceedings of the IEEE conference on computer vision and pattern recognition*. pp. 7132-7141 (2018); Deng, J., Guo, J., Xue, N., Zafeiriou, S.: Arcface: Additive angular margin loss for deep face recognition. In: Proceedings of the IEEE/CVF conference on computer vision and pattern recognition. pp. 4690-4699 (2019); Schroff, F., Kalenichenko, D., Philbin, J.: Facenet: A unified embedding for face recognition and clustering. In: *Proceedings of the IEEE conference on computer vision and pattern recognition*. pp. 815-823 (2015); and Chen, S., Liu, Y., Gao, X., Han, Z.: Mobilefacenets: Efficient cnns for accurate real-time face verification on mobile devices. In: *Chinese Conference on Biometric Recognition*. pp. 428-438. Springer (2018), each incorporated herein by reference in their entirety. All input images are pre-processed using MTCNN for face detection and alignment. DFPP is also tested against commercial APIs, including Face++ and Tencent Yunshentu, which are described in Zhang, K., Zhang, Z., Li, Z., Qiao, Y.: Joint face detection and alignment using multitask cascaded convolutional networks. *IEEE signal processing letters* 23 (10), 1499-1503 (2016), incorporated herein by reference in its entirety.

DFPP is evaluated using the Protection Success Rate (PSR), which measures the fraction of protected faces misclassified by FR models, employing thresholding for verification and a closed-set strategy for identification, which is described in Yang et al. (2021). For face identification, embodiments also use Rank-N Targeted Identity Success Rate (Rank-N-T), indicating the target image appears at least once in the top N gallery candidates, and Rank-N Untargeted Identity Success Rate (Rank-N-U), where the top N candidates exclude the original image's identity. FID scores are reported to assess the realism of protected images, which is described in Heusel, M., Ramsauer, H., Unterthiner, T., Nessler, B., Hochreiter, S.: Gans trained by a two time-scale update rule converge to a local nash equilibrium. *Advances in neural information processing systems* 30 (2017), incorporated herein by reference in its entirety. For commercial APIs, the confidence scores returned by the respective servers are directly reported.

Results of Evaluations

Protected images are generated using three surrogate FR models to mimic the decision boundary of the fourth black-box FR model, employing 10 reference makeup images as per AMT-GAN. For face verification, the system sets a threshold at 0.01 false match rate for each FR model: IRSE50 (0.241), IR152 (0.167), MobileFace (0.302), and FaceNet (0.409). Table 12 presents quantitative results for impersonation attacks in face verification, demonstrating DFPP's superior performance with average absolute PSR gains of 10% and 12% over AMT-GAN and the noise-based method, respectively, which are described in Hu et al.

(2022); and Yang et al. (2021). The PSR values for dodging and impersonation attacks under the face identification task on the LFW dataset are presented in Table 13, where DFPP demonstrates superior performance compared to conventional methods at both Rank-1 and Rank-5 settings. This evaluation randomly selects 500 subjects, each having a pair of faces. One image is assigned from each pair to the gallery set, and the other to the probe set. Both impersonation and dodging attacks are conducted on the probe set. AMT-GAN and Adv-Makeup are excluded from both tables, as they are specifically trained for the face verification task.

Figure 11:
FIG. 11 are images illustrating a qualitative comparison of DPFF with TIP-IM and AMTGAN approaches.

FIG. 11 illustrates a qualitative comparison of DPFF with TIP-IM and AMTGAN approaches, which are described in Yang et al. (2021) and Hu et al. (2022). DPFF generates naturalistic images that maintain the human-perceived identity of the original, while faithfully transferring the makeup from the reference image (shown in the top row of the bottom corner of FIG. 11).

Thus, qualitative results in FIG. 11 demonstrate DFPP's superiority in generating realistic protected faces. Unlike TIP-IM's noise artifacts and AMT-GAN's unrealistic makeup effects, DFPP produces natural-looking faces that faithfully replicate the reference image's makeup style.

TABLE 12

Protection success rate (PSR %) of black-box impersonation attack under face verification task where for each column the other three FR models are used as surrogates.

| | CelebA-HQ | | | | LADN-Dataset | | | | |
|---|---|---|---|---|---|---|---|---|---|
| Method | IRSE50 | IR152 | FaceNet | MobFace | IRSE50 | IR152 | FaceNet | MobFace | Avg. |
| Clean | 7.29 | 3.80 | 1.08 | 12.68 | 2.71 | 3.61 | 0.60 | 5.11 | 4.61 |
| PGD | 36.87 | 20.68 | 1.85 | 43.99 | 40.09 | 19.59 | 3.82 | 41.09 | 25.60 |
| MI-FGSM | 45.79 | 25.03 | 2.58 | 45.85 | 48.90 | 25.57 | 6.31 | 45.01 | 30.63 |
| TI-DIM | 63.63 | 36.17 | 15.30 | 57.12 | 56.36 | 34.18 | 22.11 | 48.30 | 41.64 |
| Adv-Makeup | 21.95 | 9.48 | 1.37 | 22.00 | 29.64 | 10.03 | 0.97 | 22.38 | 14.72 |
| TIP-IM | 54.40 | 37.23 | 40.74 | 48.72 | 65.89 | 43.57 | 63.50 | 46.48 | 50.06 |
| AMT-GAN | 76.96 | 35.13 | 16.62 | 50.71 | 89.64 | 49.12 | 32.13 | 72.43 | 52.84 |
| DFPP (Ours) | 78.25 | 41.25 | 40.86 | 69.34 | 90.27 | 51.66 | 49.91 | 77.14 | 62.34 |

See Madry et al.; Dong et al. (2018); Dong et al. (2019); Yin et al., *Proceedings of the* 30*th International Joint Conference on Artificial Intelligence* (*IJCAI*'21) (2021); Yang et al. (2021); and Hu et al. (2022).

TABLE 13

Protection success rate (PSR %) of black-box dodging (top) and impersonation (bottom) attacks under the face identification task for LFW dataset where for each column the other three FR systems are used as surrogates. See Huang et al. R1-U: Rank-1-Untargeted, R5-U: Rank-5-Untargeted, R1-T: Rank-1-Targeted, R5-T: Rank-5-Targeted.

| Method | IRSE50 | | IR152 | | FaceNet | | MobileFace | | Average | |
|---|---|---|---|---|---|---|---|---|---|---|
| | R1-U | R5-U | R1-U | R5-U | R1-U | R5-U | R1-U | R5-U | R1-U | R5-U |
| MI-FGSM | 70.2 | 42.6 | 58.4 | 41.8 | 59.2 | 34.0 | 68.0 | 47.2 | 63.9 | 41.4 |
| TI-DIM | 79.0 | 51.2 | 67.4 | 54.0 | 74.4 | 52.0 | 79.2 | 61.6 | 75.0 | 54.7 |
| TIP-IM | 81.4 | 52.2 | 71.8 | 54.6 | 76.0 | 49.8 | 82.2 | 63.0 | 77.8 | 54.9 |
| DFPP (Ours) | 82.2 | 55.6 | 73.0 | 55.4 | 80.8 | 53.4 | 84.2 | 66.6 | 80.05 | 57.75 |
| | R1-T | R5-T | R1-T | R5-T | R1-T | R5-T | R1-T | R5-T | R1-T | R5-T |
| MI-FGSM | 4.0 | 10.2 | 3.2 | 14.2 | 9.0 | 18.8 | 8.4 | 22.4 | 6.15 | 16.4 |
| TI-DIM | 4.0 | 13.6 | 7.8 | 19.6 | 18.0 | 32.8 | 21.6 | 39.0 | 12.85 | 26.25 |
| TIP-IM | 8.0 | 28.2 | 11.6 | 31.2 | 25.2 | 56.8 | 34.0 | 51.4 | 19.7 | 41.9 |
| DFPP (Ours) | 10.6 | 33.2 | 12.8 | 37.2 | 26.0 | 52.8 | 36.6 | 58.2 | 21.50 | 45.35 |

See Dong et al. (2018); Dong et al. (2019); and Yang et al. (2021).

Table 14 shows FID scores (lower is better) for makeup-based methods. DFPP achieves lower FID scores and higher PSR than TIP-IM and AMTGAN, balancing protection and naturalness. While Adv-Makeup has the lowest FID, its PSR is lower due to limited eye-area application. Notably, DFPP's results are comparable to CLIP2Protect, despite the latter's high-quality pre-trained generator, indicating the strong image prior imposed by untrained neural networks. Gender bias is evaluated using 1,000 male and 1,000 female faces from CelebA-HQ, generating protected faces with DFPP and MobileFace as the black-box model for impersonation in face verification. Table 15 shows that, in contrast to AMT-GAN and CLIP2Protect, DFPP's PSR is not significantly affected by gender, providing balanced protection (female/male ratio close to 1) for both male and female faces. AMT-GAN is described in Hu et al. (2022).

TABLE 14

FID and PSR comparison. PSR Gain is absolute gain in PSR relative to Adv-Makeup.

| Method | FID ↓ | PSR Gain ↑ |
|---|---|---|
| Adv-Makeup | 4.23 | 0 |
| TIP-IM | 38.73 | 35.34 |
| AMT-GAN | 34.44 | 38.12 |
| CLIP2Protect | 26.62 | 50.18 |
| DFPP (Ours) | 29.81 | 47.62 |

See *Proceedings of the* 30*th International Joint Conference on Artificial Intelligence* (*IJCAI*'21) (2021); Yang et al. (2021); Hu et al. (2022).

TABLE 15

PSR comparison on male and female faces (MobileFace as black-box). DFPP provides balanced protection (female/male ratio ≈ 1).

| Methods | Images | Male | Female | Ratio |
|---|---|---|---|---|
| AMT-GAN | 1000 | 511 | 722 | 1.41 |
| CLIP2Protect | 829 | 904 | 722 | 1.09 |
| Ours | 1000 | 802 | 817 | 1.02 |

See Hu et al. (2022).

2. Effectiveness Against Commercial APIs

Figure 12:
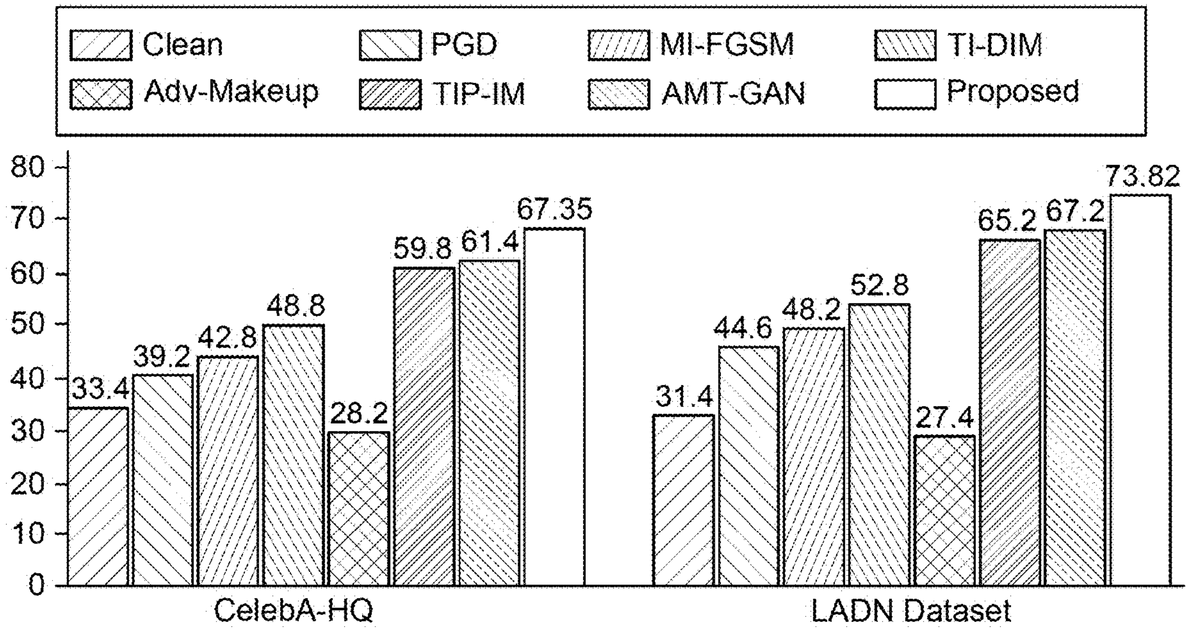
FIG. 12 is a chart of average confidence scores (where higher scores are preferable) from commercial API, Face++ for impersonation attacks within the face verification framework.

DFPP's performance is evaluated against commercial APIs (Face++ and Tencent Yunshentu) in verification mode for impersonation. These APIs return confidence scores (0-100) to measure image similarity, with higher scores indicating greater similarity. This test simulates real-world scenarios, as the training data and model parameters of these proprietary FR models are undisclosed. 100 faces are protected from CelebA-HQ using DFPP and baseline methods. FIG. 12 shows the average confidence scores returned by Face++, demonstrating DFPP's superior PSR compared to baselines. The results for Tencent Yunshentu are provided in the supplementary material.

Extension to Videos

Figure 13:
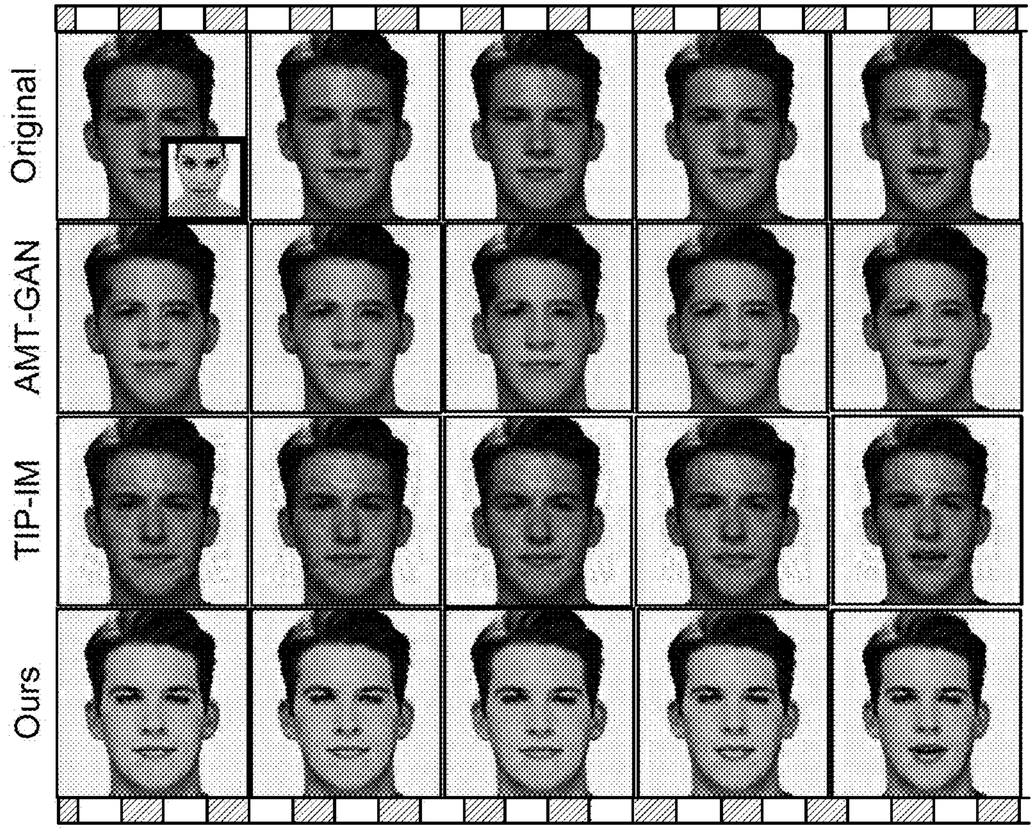
FIG. 13 are images illustrating qualitative results on videos produced by AMT-GAN, TIP-IM, and the disclosed approach for black-box impersonation attacks in the face verification framework.

The further method can be extended to videos by leveraging temporal information. Specifically, for each subsequent frame, the decoder parameters are initialized using those optimized for the preceding frame. This strategy provides an advantageous initialization for optimization, facilitating faster convergence. Evaluations on 10 randomly chosen videos from the RAVDESS dataset indicate that DFPP outperforms AMT-GAN, achieving an absolute improvement of 3.2 in FID score, all the while requiring 10× fewer iterations compared to its image-centric counterpart, which is described in Livingstone, S. R., Russo, F. A.: The ryerson audio-visual database of emotional speech and song (ravdess): A dynamic, multimodal set of facial and vocal expressions in north american english. PloS one 13 (5), e0196391 (2018), incorporated herein by reference in its entirety. FIG. 13 illustrates qualitative results, demonstrating the superior naturalness of the method and the adherence to the reference makeup style.

Ablation Studies

Ablation studies are conducted to assess the significance of individual components within the overall framework.

Figure 14:
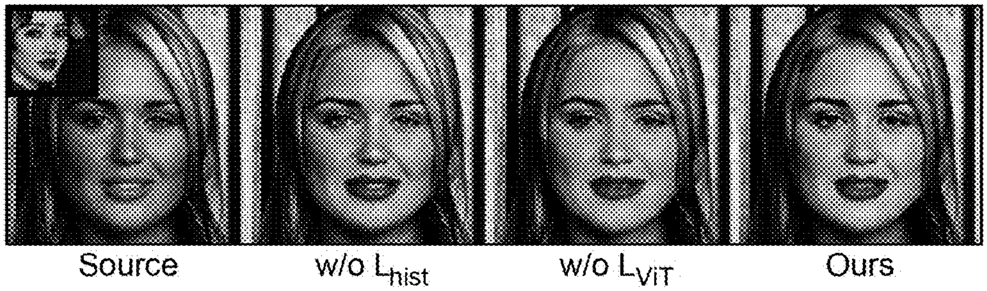
FIG. 14 are images illustrating an ablation study on histogram and ViT structural losses.

The performance of individual loss components are determined, both qualitatively and quantitatively. The results presented in FIG. 14 highlight the significance of each loss components. Specifically, omitting the histogram loss leads to an imperfect transfer of makeup color from the reference makeup to the source image. On the other hand, the absence of the ViT structure loss results in a subtle alteration in the identity of the source image compared to a full objective is employed. A quantitative analysis is provided on the histogram, ViT structure and global loss functions of the further method in Table 16. It should be noted that the structure loss helps in maintaining the structural consistency between the source and protected image while histogram and global losses ensure faithful makeup transfer between reference image and the protected sample at the local and global levels respectively. As expected, removing the global loss (Lglob) increases the FID (Table 16), verifying its importance in preserving the naturalness of the protected sample.

TABLE 16

Quantitative ablative analysis on the histogram, ViT structure, and global losses.

| Metrics | w/o $\mathcal{L}_{hist}$ | w/o $\mathcal{L}_{ViT}$ | w/o $\mathcal{L}_{glob}$ | Overall |
|---|---|---|---|---|
| FID ↓ | 30.64 | 30.91 | 31.07 | 29.81 |
| PSR ↑ | 69.31 | 70.22 | 69.24 | 69.34 |

Figure 15:
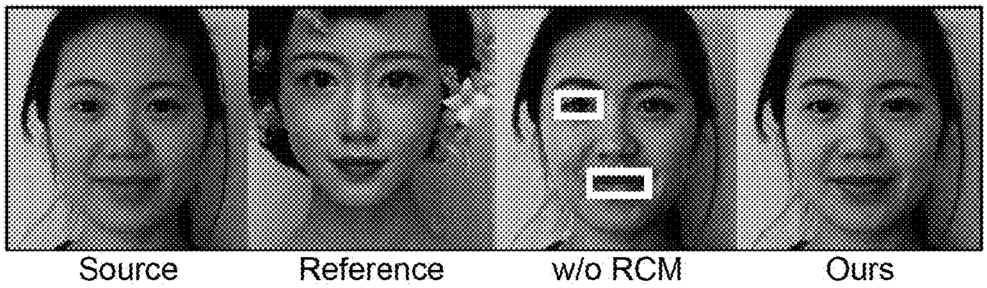
FIG. 15 are images illustrating an ablation for robust correspondence module (RCM)

The robust correspondence module (RCM) is crucial for ensuring a faithful makeup transfer between corresponding regions of the source and reference makeup images. As demonstrated in the qualitative results presented in FIG. 15, the absence of the correspondence module leads to makeup artifacts stemming from adversarial toxicity. These artifacts can manifest as misplaced makeup elements or unnatural blending, compromising the overall realism of the protected image. By incorporating the RCM, the further method achieves a more precise and natural-looking makeup transfer, effectively maintaining the identity of the source image while applying the desired makeup style.

The influence of different reference makeup images is assessed on the PSR of the resulting output image. Five reference makeup images are used to protect 500 CelebA-HQ images with the further method. The results in Table 17 indicate a slight variation in the PSR (reflected in the low standard deviation) across different makeup reference images, indicating that DFPP is robust to a range of makeup styles.

TABLE 17

Average PSR of DFPP on CelebA-HQ images with 5 reference makeup images provided by Hu et al. (2022).

| | Ref-1 | Ref-2 | Ref-3 | Ref-4 | Ref-5 | Std. ↓ |
|---|---|---|---|---|---|---|
| PSR | 62.2 | 60.4 | 63.6 | 66.0 | 60.8 | 2.03 |

Std. denotes standard deviation.

Figure 16:
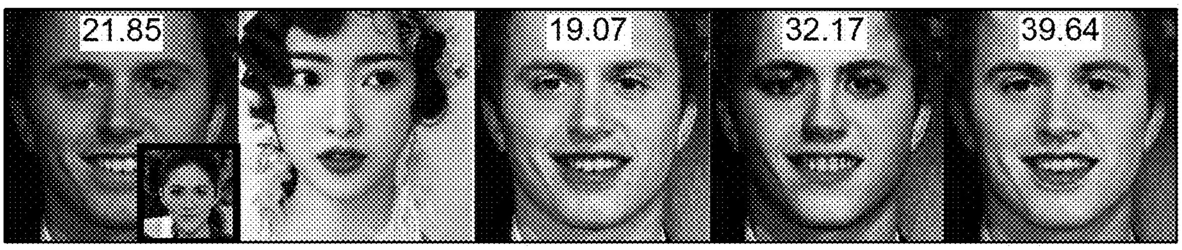
FIG. 16 are images illustrating a qualitative comparison with BeautyGAN.

A visual quality comparison is presented between facial privacy protection methods (DFPP and AMT-GAN) and solely makeup transfer methods like BeautyGAN, as described in Li et al. (2018). As depicted in FIG. 16, BeautyGAN proficiently transfers makeup but falls short in providing protection. In contrast, the further method maintains image quality on par with BeautyGAN while achieving a PSR higher than AMT-GAN. This demonstrates DFPP's ability to strike a crucial balance between aesthetic makeup application and effective privacy protection. The high-quality result highlight the potential of the further method in real-world scenarios where both visual appeal and privacy safeguards are essential.

The further method adopts the single target and ensemble settings from the conventional makeup image-based facial privacy approach described in Hu et al. (2022). Evaluations showed results with this setting. For TIP-IM, official implementation were relied on to run the experiments in the AMT-GAN settings (4 FR models, single target, ensemble). Here, the results are also provided in TIP-IM settings that is with multi-target and without ensemble. As depicted in Table 18, the DFPP approach consistently outperforms TIP-IM in both multi-target and non-ensemble configurations. This demonstrates the versatility and robustness of DFPP across different operational settings. IRSE50 is deployed as a black-box model, with MobileFace, IR152, and FaceNet acting as surrogates in the ensemble (ens.) setting, and only MobileFace as a surrogate in w/o ensemble setting.

TABLE 18

PSR for multi-targets and w/o ensemble (ens.) (Rank-1-Targeted).

| Method | ens. 1-target | ens. 4-targets | ens. 10 targets | w/o ens. (10 targets) |
|---|---|---|---|---|
| TIP-IM | 8.0 | 23.4 | 69.4 | 55.4 |
| Ours | 10.2 | 26.6 | 71.8 | 58.4 |

The datasets and preprocessing steps used in evaluations are further described.

CelebA-HQ is a high-resolution dataset (1024×1024) with 30,000 images, as described in Karras, T., Aila, T., Laine, S., Lehtinen, J.: Progressive growing of gans for improved quality, stability, and variation. *arXiv preprint arXiv:* 1710.10196 (2017), incorporated herein by reference in its entirety. The evaluations also use 1000 images of different identities as provided by Hu et al. (2022)

used for face verification (dodging) and face identification (impersonation and dodging). 500 pairs are selected, each of the same identity.

CelebA-HQ and LADN are used for impersonation attacks in face verification, and CelebA-HQ and LFW for other settings. This combination demonstrates the further method's generalization across high-quality (CelebA-HQ) and low-quality (LFW) images.

MTCNN is used for face detection, cropping, and alignment before input to FR models, as described in Zhang et al. Additional preprocessing follows Tov et al. for latent code initialization, as described in Tov, O., Alaluf, Y., Nitzan, Y., Patashnik, O., Cohen-Or, D.: Designing an encoder for stylegan image manipulation. *ACM Transactions on Graphics* (*TOG*) 40 (4), 1-14 (2021), incorporated herein by reference in its entirety.

Table 19 presents PSR results for dodging attacks in face verification under a blackbox setting. 500 randomly selected subjects are used, each with a pair of faces. DFPP is compared only with the state-of-the-art noise-based method TIP-IM, as Adv-Makeup and AMT-GAN are designed specifically for impersonation attacks. A description of TIP-1M is provided in Yin et al., *Proceedings of the* 30*th International Joint Conference on Artificial Intelligence* (*IJCAI*'21) (2021); and Hu et al. (2022). The further method DFPP demonstrates superior performance, achieving an absolute gain of over 5% compared to TIP-IM.

TABLE 19

Protection success rate (PSR %) of black-box dodging attack under the face verification task. For each column, the other three FR systems are used as surrogates to generate the protected faces. Adv-Makeup and AMT-GAN are excluded as they are trained specifically for impersonation attacks.

| | CelebA-HQ | | | | LFW | | | | |
|---|---|---|---|---|---|---|---|---|---|
| Method | IRSE50 | IR152 | FaceNet | MobileFace | IRSE50 | IR152 | FaceNet | MobileFace | Average |
| TIP-IM | 71.2 | 69.4 | 88.2 | 59.0 | 71.8 | 76.1 | 80.6 | 62.9 | 72.4 |
| DFPP (Ours) | 79.0 | 80.4 | 91.7 | 62.1 | 76.2 | 78.6 | 85.3 | 70.9 | 78.0 |

LADN is a makeup-based dataset used for impersonation attacks in face verification, as described in Gu et al. (2019). The evaluations use 332 non-makeup images split into four groups, each targeting one of four identities provided by Hu et al. (2022)

LFW is a face identification dataset with 13,233 images and 5,749 identities, as described in Huang et al. LFW is Results for Face Identification The PSR on CelebA-HQ datasets for dodging and impersonation attacks are provided in Table 20. This evaluation randomly selects 500 subjects, each having a pair of faces. One image is selected from each pair to the gallery set, and the other to the probe set. Both impersonation and dodging attacks are conducted on the probe set. AMT-GAN and Adv-Makeup are excluded from both tables, as they are specifically trained for the face verification task.

TABLE 20

Protection success rate (PSR %) of black-box dodging (top) and impersonation (bottom) attacks under the face identification task for CelebA-HQ dataset, which is described in Huang et al. For each column, the other three FR systems are used as surrogates to generate the protected faces. R1-U: Rank-1-Untargeted, R5-U: Rank-5-Untargeted, R1-T: Rank-1-Targeted, R5-T: Rank-5-Targeted.

| Method | IRSE50 | | IR152 | | FaceNet | | MobileFace | | Average | |
|---|---|---|---|---|---|---|---|---|---|---|
| | R1-U | R5-U | R1-U | R5-U | R1-U | R5-U | R1-U | R5-U | R1-U | R5-U |
| TIP-IM | 79.6 | 61.2 | 62.9 | 42.8 | 46.2 | 27.8 | 81.9 | 76.7 | 67.6 | 52.1 |
| Ours | 85.2 | 68.8 | 67.4 | 45.3 | 54.1 | 29.5 | 91.2 | 81.0 | 74.5 | 56.1 |

TABLE 20-continued

Protection success rate (PSR %) of black-box dodging (top) and impersonation (bottom) attacks under the face identification task for CelebA-HQ dataset, which is described in Huang et al. For each column, the other three FR systems are used as surrogates to generate the protected faces. R1-U: Rank-1-Untargeted, R5-U: Rank-5-Untargeted, R1-T: Rank-1-Targeted, R5-T: Rank-5-Targeted.

| Method | IRSE50 | | IR152 | | FaceNet | | MobileFace | | Average | |
|---|---|---|---|---|---|---|---|---|---|---|
| | R1-T | R5-T | R1-T | R5-T | R1-T | R5-T | R1-T | R5-T | R1-T | R5-T |
| TIP-IM | 16.2 | 51.4 | 21.2 | 56.0 | 8.1 | 35.8 | 9.6 | 24.0 | 13.8 | 41.8 |
| Ours | 22.1 | 60.2 | 23.7 | 62.4 | 11.8 | 37.4 | 11.1 | 27.6 | 17.2 | 46.9 |

See Yang et al. (2020).

Results for Tencent Yunshent API

Figure 17:
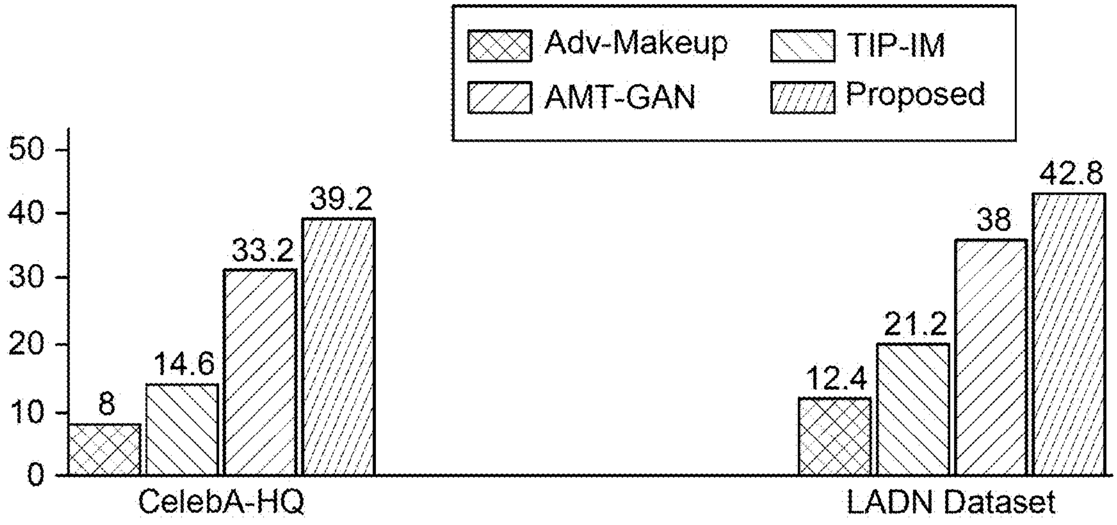
FIG. 17 is a chart of average confidence scores (where higher scores are preferable) from commercial API Tencent Yunshentu for impersonation attacks within the face verification framework.

DFPP's evaluate effectiveness against the commercial API Tencent Yunshentu, operating in verification mode for impersonation. This API returns confidence scores from 0 to 100, with higher scores indicating greater similarity between two images. As the training data and model parameters of this proprietary FR system are undisclosed, this test effectively simulates a real-world scenario. 100 faces protect from the CelebA-HQ dataset using both baseline methods and DFPP. FIG. 17 illustrates the average confidence scores returned by Tencent Yunshentu for these protected images. The results clearly demonstrate DFPP's superior PSR compared to the baselines, underscoring its effectiveness in real-world applications.

Figure 18:
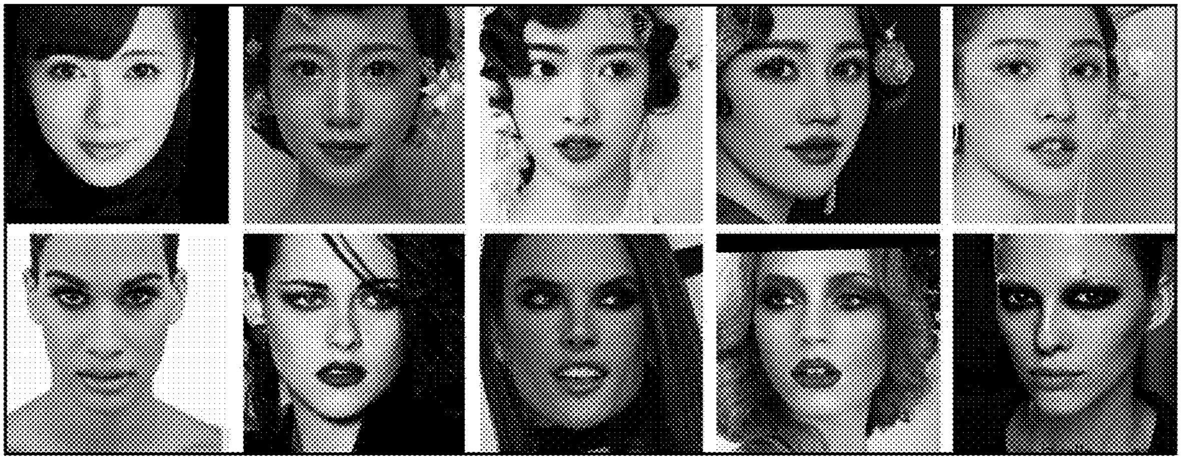
FIG. 18 are images illustrating reference makeup images to adversarially transfer makeup to the source image.

All evaluations utilize the reference makeup images as shown in FIG. 18. These diverse images, provided by Hu et al. (2022), represent a wide range of makeup styles, from subtle to dramatic. The results are averaged over these ten reference images, ensuring a comprehensive evaluation of the further method's performance across various makeup styles.

Figure 19:
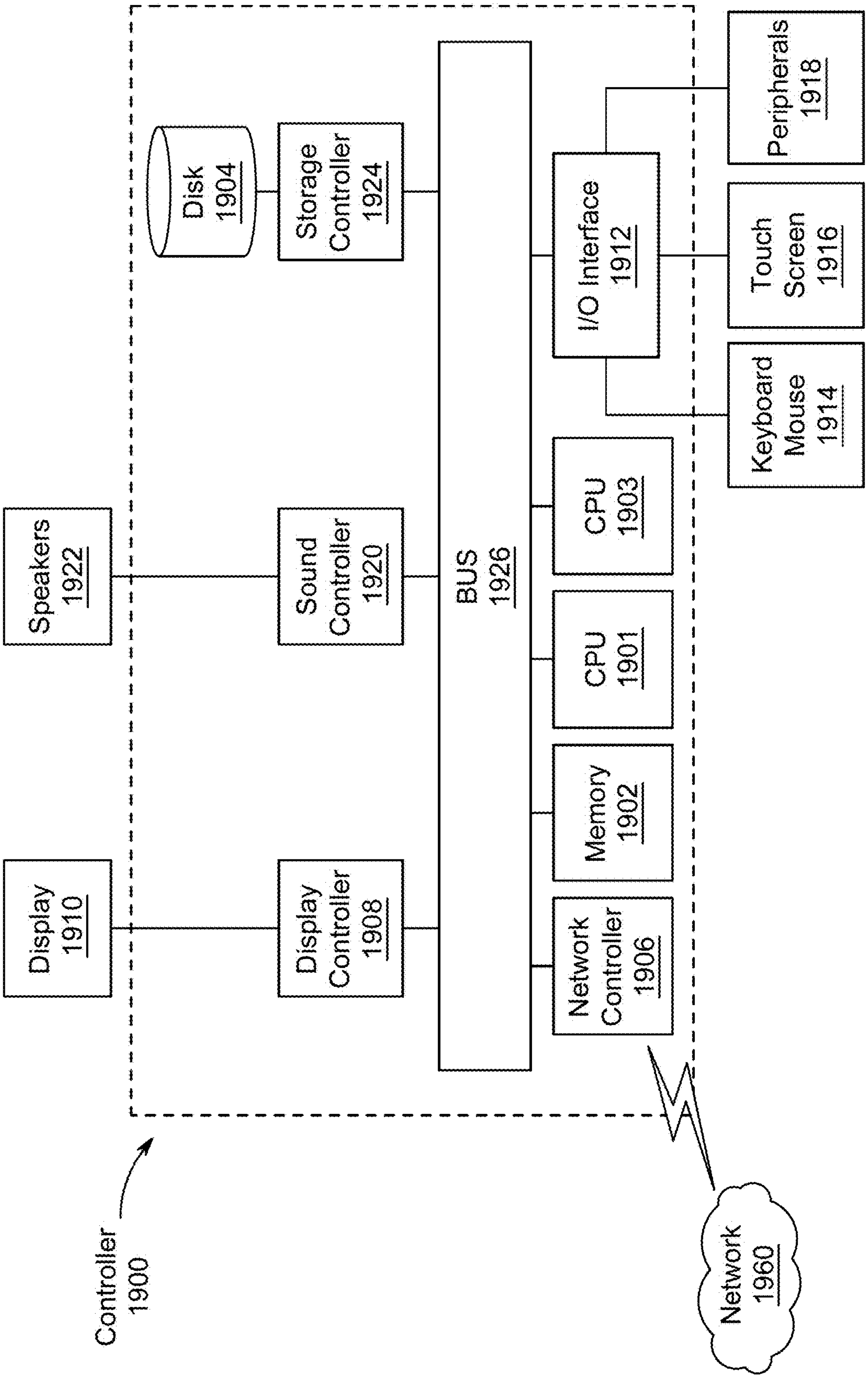
FIG. 19 is an illustration of a non-limiting example of details of computing hardware used in the computing system, according to certain embodiments.

Exemplary hardware embodiments are described with reference to FIG. 19. In FIG. 19, a controller 1900 is described is representative of the system in which the controller is a computing device which includes a CPU 1901 which performs the processes described above/below. The process data and instructions may be stored in memory 1902. These processes and instructions may also be stored on a storage medium disk 1904 such as a hard drive (HDD) or portable storage medium or may be stored remotely.

Further, the present disclosure is not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the present disclosure may be provided as a utility application, background daemon, or component of an operating system, or combination thereof, executing in conjunction with CPU 1901, 1903 and an operating system such as Microsoft Windows 7, Microsoft Windows 10, UNIX, LINUX, Apple MAC-OS and other systems known to those skilled in the art.

The hardware elements in order to achieve the computing device may be realized by various circuitry elements, known to those skilled in the art. For example, CPU 1901 or CPU 1903 may be a Xenon or Core processor from Intel of America or an Opteron processor from AMD of America, or may be other processor types that would be recognized by one of ordinary skill in the art. Alternatively, the CPU 1901, 1903 may be implemented on an FPGA, ASIC, PLD or using discrete logic circuits, as one of ordinary skill in the art would recognize. Further, C P U 1901, 1903 may be implemented as multiple processors cooperatively working in parallel to perform the instructions of the inventive processes described above.

The computing device in FIG. 19 also includes a network controller 1906, such as an Intel Ethernet PRO network interface card from Intel Corporation of America, for interfacing with network 1960. As can be appreciated, the network 1960 can be a public network, such as the Internet, or a private network such as an LAN or WAN network, or any combination thereof and can also include PSTN or ISDN sub-networks. The network 1960 can also be wired, such as an Ethernet network, or can be wireless such as a cellular network including EDGE, 3G, 4G, and 5G wireless cellular systems. The wireless network can also be WiFi, Bluetooth, or any other wireless form of communication that is known.

The computing device further includes a display controller 1908, such as a NVIDIA GeForce GTX or Quadro graphics adaptor from NVIDIA Corporation of America for interfacing with display 1910, such as a Hewlett Packard HPL2445w LCD monitor. A general purpose I/O interface 1912 interfaces with a keyboard and/or mouse 1914 as well as a touch screen panel 1916 on or separate from display 1910. General purpose I/O interface also connects to a variety of peripherals 1918 including printers and scanners, such as an OfficeJet or DeskJet from Hewlett Packard.

A sound controller 1920 is also provided in the computing device such as Sound Blaster X-Fi Titanium from Creative, to interface with speakers/microphone 1922 thereby providing sounds and/or music.

The general purpose storage controller 1924 connects the storage medium disk 1904 with communication bus 1926, which may be an ISA, EISA, VESA, PCI, or similar, for interconnecting all of the components of the computing device. A description of the general features and functionality of the display 1910, keyboard and/or mouse 1914, as well as the display controller 1908, storage controller 1924, network controller 1906, sound controller 1920, and general purpose I/O interface 1912 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 20.

Figure 20:
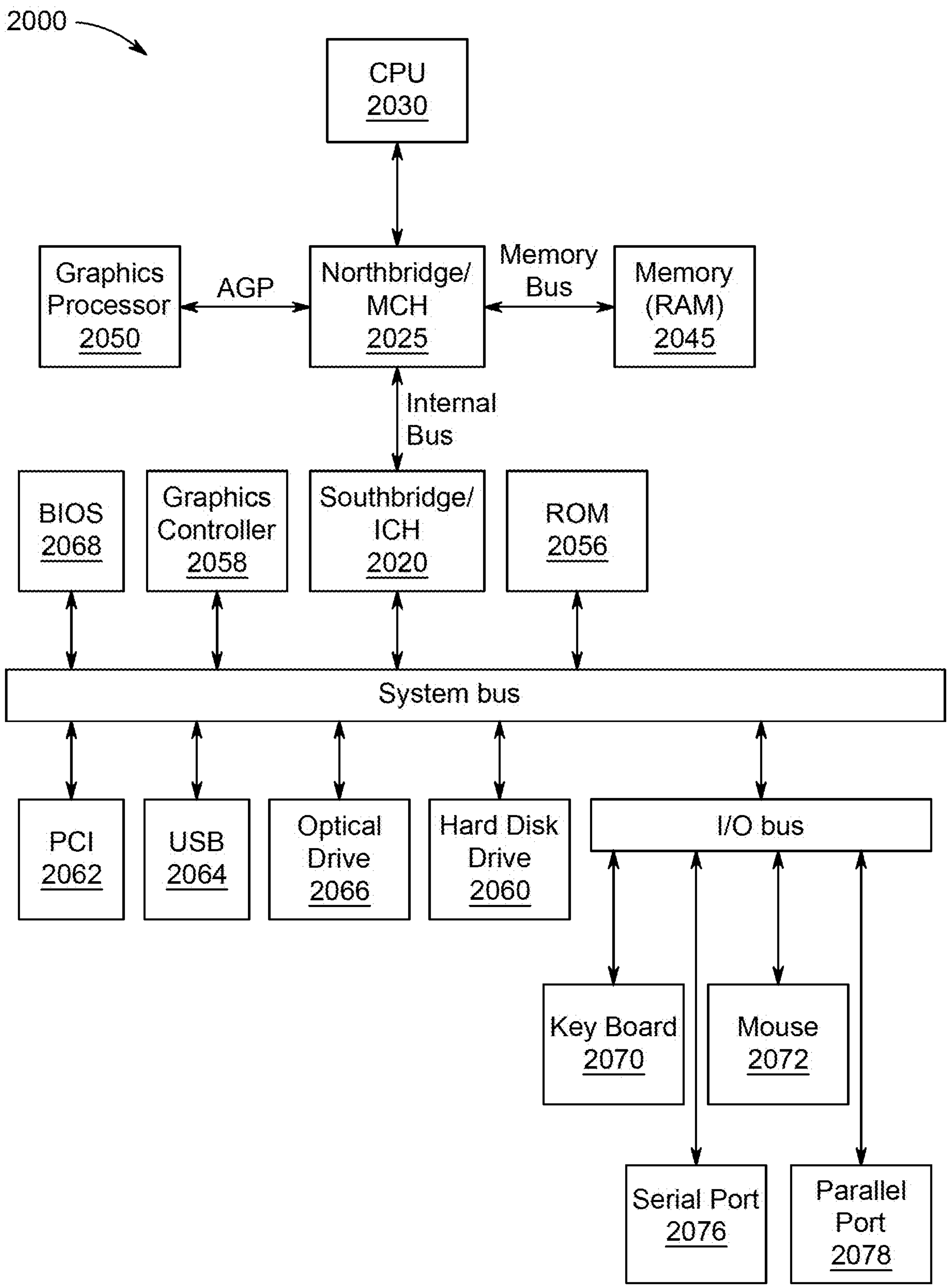
FIG. 20 is an exemplary schematic diagram of a data processing system used within the computing system, according to certain embodiments.

FIG. 20 shows a schematic diagram of a data processing system, according to certain embodiments, for performing the functions of the exemplary embodiments. The data processing system is an example of a computer in which code or instructions implementing the processes of the illustrative embodiments may be located.

In FIG. 20, data processing system 2000 employs a hub architecture including a north bridge and memory controller hub (NB/MCH) 2025 and a south bridge and input/output (I/O) controller hub (SB/ICH) 2020. The central processing unit (CPU) 2030 is connected to NB/MCH 2025. The NB/MCH 2025 also connects to the memory 2045 via a memory bus, and connects to the graphics processor 2050 via an accelerated graphics port (AGP). The NB/MCH 2025 also connects to the SB/ICH 2020 via an internal bus (e.g., a unified media interface or a direct media interface). The CPU Processing unit 2030 may contain one or more processors and even may be implemented using one or more heterogeneous processor systems.

Figure 21:
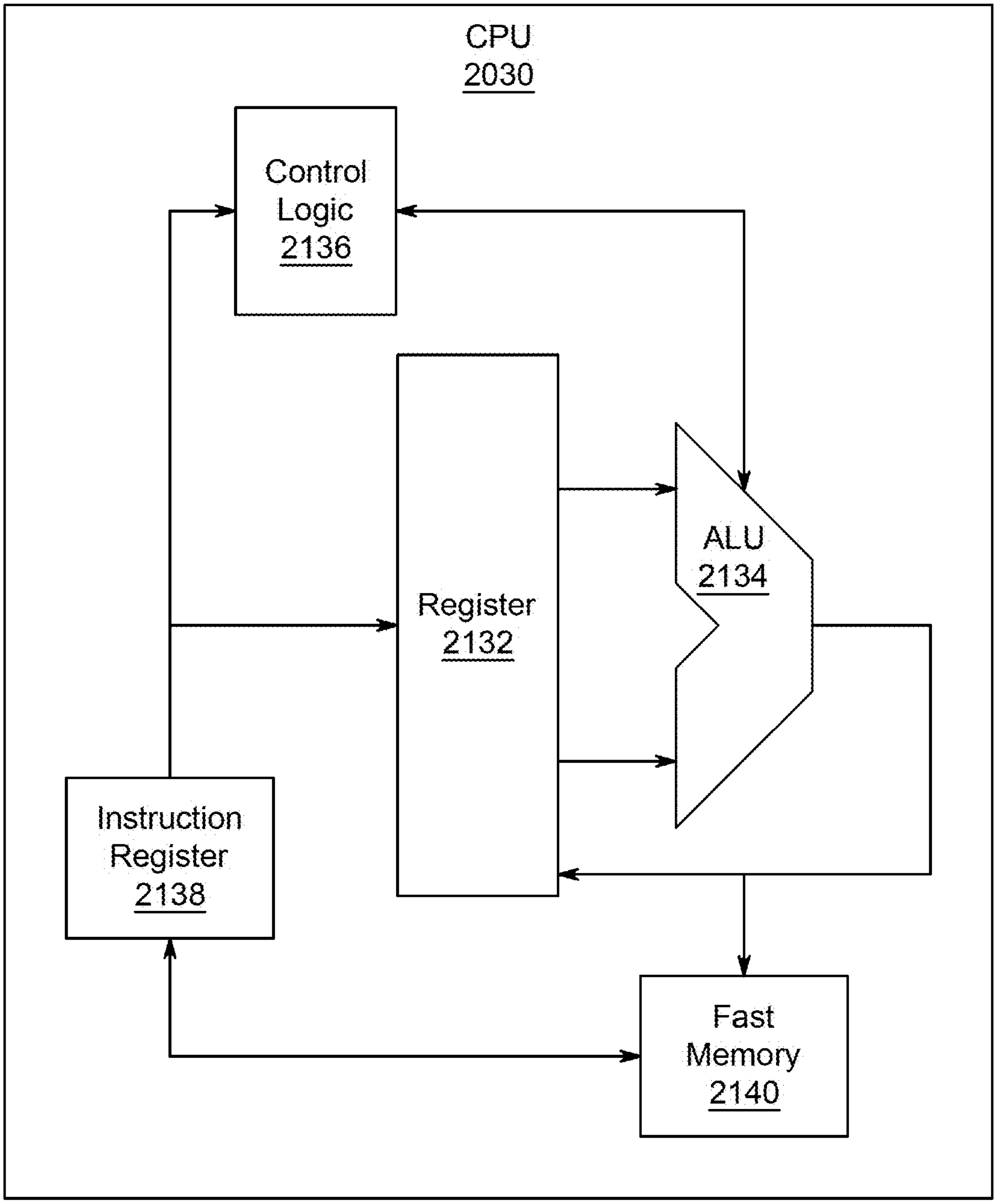
FIG. 21 is an exemplary schematic diagram of a processor used with the computing system, according to certain embodiment.

For example, FIG. 21 shows one implementation of CPU 2030. In one implementation, the instruction register 2138 retrieves instructions from the fast memory 2140. At least part of these instructions are fetched from the instruction register 2138 by the control logic 2136 and interpreted according to the instruction set architecture of the CPU 2030. Part of the instructions can also be directed to the register 2132. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 2134 that loads values from the register 2132 and performs logical and mathematical operations on the loaded values according to the instructions. The results from these operations can be feedback into the register and/or stored in the fast memory 2140. According to certain implementations, the instruction set architecture of the CPU 2030 can use a reduced instruction set architecture, a complex instruction set architecture, a vector processor architecture, a very large instruction word architecture. Furthermore, the CPU 2030 can be based on the Von Neuman model or the Harvard model. The CPU 2030 can be a digital signal processor, an FPGA, an ASIC, a PLA, a PLD, or a CPLD. Further, the CPU 2030 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 20, the data processing system 2000 can include that the SB/ICH 2020 is coupled through a system bus to an I/O Bus, a read only memory (ROM) 2056, universal serial bus (USB) port 2064, a flash binary input/output system (BIOS) 2068, and a graphics controller 2058. PCI/PCIe devices can also be coupled to SB/ICH 2088 through a PCI bus 2062.

The PCI devices may include, for example, Ethernet adapters, add-in cards, and PC cards for notebook computers. The Hard disk drive 2060 and CD-ROM 2066 can use, for example, an integrated drive electronics (IDE) or serial advanced technology attachment (SATA) interface. In one implementation the I/O bus can include a super I/O (SIO) device.

Further, the hard disk drive (HDD) 2060 and optical drive 2066 can also be coupled to the SB/ICH 2020 through a system bus. In one implementation, a keyboard 2070, a mouse 2072, a parallel port 2078, and a serial port 2076 can be connected to the system bus through the I/O bus. Other peripherals and devices that can be connected to the SB/ICH 2020 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 22:
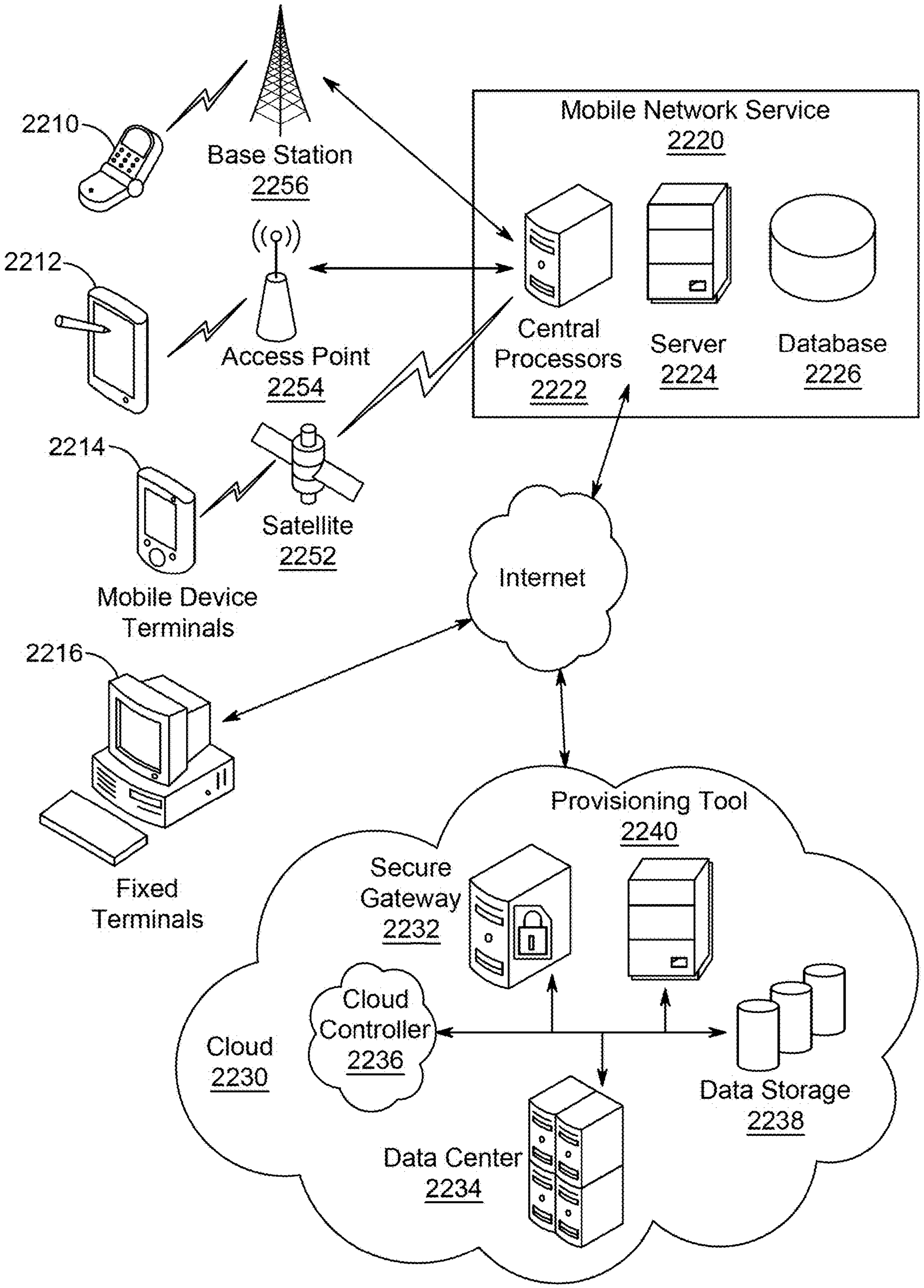
FIG. 22 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 22, in addition to various human interface and communication devices (e.g., display monitors, smart phones, tablets, personal digital assistants (PDAs)). More specifically, FIG. 22 illustrates client devices including a smart phone 2211, a tablet 2212, a mobile device terminal 2214 and fixed terminals 2216. These client devices may be commutatively coupled with a mobile network service 2220 via a base station 2256, an access point 2254, a satellite 2252 or via an internet connection. The mobile network service 2220 may comprise central processors 2222, a server 2224 and a database 2226. The fixed terminals 2216 and the mobile network service 2220 may be commutatively coupled via an internet connection to functions in cloud 2230 that may comprise a security gateway 2232, a data center 2234, a cloud controller 2236, a data storage 2238 and a provisioning tool 2240. The network may be a private network, such as the LAN or the WAN, or may be the public network, such as the Internet. Input to the system may be received via direct user input and received remotely either in real-time or as a batch process. Additionally, some implementations may be performed on modules or hardware not identical to those described. Accordingly, other implementations are within the scope that may be disclosed.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A system to protect user facial privacy against unknown face recognition levels, comprising:

an input source to input an original face image;

a training circuit configured to train a generator model to output an image that resembles the original face image;

an optimizer configured to generate a protected face image based on the trained model that fools a black-box face recognition model, while imitating a makeup style; and a display device to display the protected face image online, wherein the training circuit includes a latent Code Initialization stage that inverts the original face image into latent space, as latent code, and finetunes the generator model to achieve an accurate reconstruction of the original face image from its latent code;

wherein the optimizer includes a Text-Guided Adversarial Optimization stage that uses user-defined makeup text prompts and identity preserving regularization to guide a search for adversarial codes in the latent space.

2. The system of claim 1, further comprising an optimization function that minimizes H(xp, x), where H quantifies a degree of unnaturalness introduced in the protected image xp in relation to the original image x; and constraining, by the optimization function, a solution search space to a natural image manifold using an effective image prior which can produce more realistic images.

3. The system of claim 2, wherein the Latent Code Initialization stage includes an encoder to inferring $w_{inv}$ in W from x, by an encoder, where $w_{inv}$=I(x) is a pretrained encoder, and a decoder Gθ($w_{inv}$) that is finetuned.

4. The system of claim 1, wherein the Text-Guided Adversarial Optimization stage includes aligning an output adversarial image from the Latent Code Initialization stage with a text prompt $t_{makeup}$ in an embedding space of a pretrained vision-language model (CLIP), in which the Text-Guided Adversarial Optimization stage performs the optimization using a directional CLIP loss that aligns a direction of CLIP between text-image pairs of the original and adversarial images.

5. The system of claim 1, wherein the Text-Guided Adversarial Optimization stage includes constraining the latent code to remain substantially at initialization $w_{inv}$, by performing the adversarial optimization on an ensemble of white-box surrogate models to imitate a decision boundary of an unknown face recognition model.

6. The system of claim 1, wherein the Text-Guided Adversarial Optimization stage includes perturbing only those latent codes associated with deeper layers of StyleGAN, thereby restricting adversarial faces to the identity preserving manifold, and constraining the latent code to stay substantially at its initial value Winy using a latent loss function.

7. The system of claim 1, wherein the training circuit includes a robust correspondence module adversarially transfer makeup from a reference image to the original face image, wherein the optimizer includes a randomly initialized conditional decoder with Adaptive Makeup Conditioning (AMC) layers, and optimize parameters of the decoder at test-time to generate the protected face image.

8. The system of claim 7, wherein the robust correspondence module is configured to feed the original face image and the makeup reference image into multi-scale feature extractor networks to extract deep features, and compute a dense semantic correspondence matrix, wherein the correspondence matrix is computed as spatially constraining semantic correspondences among facial regions of the original face image and the makeup reference image in deep feature space, using facial parsing masks as guidance.

9. The system of claim 7, wherein the decoder is finetuned using structured, makeup, and adversarial losses to effectively protect facial privacy.

10. A method to protect user facial privacy against unknown face recognition levels, comprising:

inputting, by an input source, an original face image;

training, by a training circuit, a generator model to output an image that resembles the original face image;

generating, by an optimizer, a protected face image based on the trained model that fools a black-box face recognition model, while imitating a makeup style; and displaying, by a display device, the protected face image online, wherein the training circuit includes a latent Code Initialization stage that inverting, by the training circuit, the original face image into latent space, as latent code, and finetuning the generator model to achieve an accurate reconstruction of the original face image from its latent code;

wherein the optimizer includes a Text-Guided Adversarial Optimization stage that uses user-defined makeup text prompts and identity preserving regularization to guiding, by the optimizer that uses user-defined makeup text prompts and identity preserving regularization, a search for adversarial codes in the latent space.

11. The method of claim 10, further comprising minimizing H(xp, x), by an optimization function, where H quantifies a degree of unnaturalness introduced in the protected image xp in relation to the original image x;

wherein the optimization function constrains a solution search space to a natural image manifold using an effective image prior can produce more realistic images.

12. The method of claim 11, further comprising inferring $w_{inv}$ in W from x by an encoder, where $w_{inv}$=I(x) is a pretrained encoder, and by a decoder Gθ($w_{inv}$) that is finetuned.

13. The method of claim 10, further comprising:

aligning, by the Text-Guided Adversarial Optimization stage, an output adversarial image from the Latent Code Initialization stage with a text prompt $t_{makeup}$ in an embedding space of a pretrained vision-language model (CLIP); and performing the optimization, by the Text-Guided Adversarial Optimization stage, using a directional CLIP loss that aligns, by a direction of CLIP-space between text-image pairs of the original and adversarial images.

14. The method of claim 10, further comprising constraining, by the Text-Guided Adversarial Optimization stage, the latent code to remain substantially at initialization $w_{inv}$, by performing the adversarial optimization on an ensemble of white-box surrogate models to imitate a decision boundary of an unknown face recognition model.

15. The method of claim 10, further comprising perturbing, by the Text-Guided Adversarial Optimization stage, only those latent codes associated with deeper layers of StyleGAN, thereby restricting adversarial faces to the identity preserving manifold; and constraining the latent code to stay substantially at its initial value $w_{inv}$ using a latent loss function.

16. The method of claim 10, further comprising:

adversarially transferring, by the training circuit that includes a robust correspondence module, makeup from a reference image to the original face image; and optimizing, by the optimizer that includes a randomly initialized conditional decoder with Adaptive Makeup Conditioning (AMC) layers, parameters of the decoder at test-time to generate the protected face image.

17. The method of claim 16, further comprising:

wherein the robust correspondence module is configured to feeding the original face image and the makeup reference image into multi-scale feature extractor networks to extract deep features; and computing a dense semantic correspondence matrix, wherein the correspondence matrix is computed as spatially constraining semantic correspondences among facial regions of the original face image and the makeup reference image in deep feature space, using facial parsing masks as guidance.

18. The method of claim 16, further comprising fine-tuning the decoder using structured, makeup, and adversarial losses to effectively protect facial privacy.

* * * * *